US009607548B2

(12) United States Patent
Kimura et al.

(10) Patent No.: US 9,607,548 B2
(45) Date of Patent: Mar. 28, 2017

(54) DISPLAY DEVICE

(71) Applicant: Japan Display Inc., Minato-ku (JP)

(72) Inventors: Hiroyuki Kimura, Tokyo (JP); Tetsuo Morita, Tokyo (JP); Hiroshi Tabatake, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/573,588

(22) Filed: Dec. 17, 2014

(65) Prior Publication Data

US 2015/0187272 A1 Jul. 2, 2015

(30) Foreign Application Priority Data

Dec. 27, 2013 (JP) ................................ 2013-270960

(51) Int. Cl.
*G09G 3/32* (2016.01)
*G09G 3/3258* (2016.01)
(Continued)

(52) U.S. Cl.
CPC ........... *G09G 3/3258* (2013.01); *G09G 3/007* (2013.01); *G09G 3/20* (2013.01); *G09G 3/2003* (2013.01);
(Continued)

(58) Field of Classification Search
CPC .. G09G 3/3258; G09G 3/2074; G09G 3/3208; G09G 3/2003; G09G 3/007;
(Continued)

(56) References Cited

U.S. PATENT DOCUMENTS

2007/0063935 A1* 3/2007 Yoshida ................. G09G 3/325 345/76
2007/0268210 A1* 11/2007 Uchino ................ G09G 3/3233 345/55
(Continued)

FOREIGN PATENT DOCUMENTS

CN 102047313 A 5/2011
JP 2007-310311 11/2007
(Continued)

OTHER PUBLICATIONS

Office Action mailed Feb. 17, 2016 in Taiwanese Application No. 103144854 (w/English translation).
(Continued)

*Primary Examiner* — Andrew Sasinowski
*Assistant Examiner* — Chineyere Wills-Burns
(74) *Attorney, Agent, or Firm* — Oblon, McClelland, Maier & Neustadt, L.L.P.

(57) ABSTRACT

According to one embodiment, a display device includes a plurality of pixels each including a plurality of subpixels, each subpixel including a luminescent element, a plurality of scanning lines, a plurality of image signal lines, a plurality of reset power source lines, a first power source line, a scanning line driving circuit and a signal line driving circuit, wherein at least one subpixel comprises an output switch, a driving transistor, a retaining capacitance, a pixel switch and a reset switch, and the output switch is shared with a plurality of subpixels included in at least one pixel.

10 Claims, 23 Drawing Sheets

(51) Int. Cl.
*G09G 3/00* (2006.01)
*G09G 3/3208* (2016.01)
*G09G 3/20* (2006.01)

(52) U.S. Cl.
CPC ......... *G09G 3/2074* (2013.01); *G09G 3/3208* (2013.01); *G09G 2300/046* (2013.01); *G09G 2300/0408* (2013.01); *G09G 2300/0447* (2013.01); *G09G 2300/0804* (2013.01)

(58) Field of Classification Search
CPC ..... G09G 2300/0408; G09G 2300/046; G09G 2300/0804; G09G 2300/0447
USPC .......................................................... 345/694
See application file for complete search history.

(56) References Cited

U.S. PATENT DOCUMENTS

2009/0295422 A1* 12/2009 Hamer ................. G09G 3/3233 324/760.02
2010/0149393 A1* 6/2010 Zarnowski ............. H04N 9/045 348/302
2010/0188384 A1 7/2010 Uchino et al.
2013/0215092 A1 8/2013 Wu et al.
2014/0111557 A1 4/2014 Omata et al.

FOREIGN PATENT DOCUMENTS

| | | |
|---|---|---|
| JP | 2011-145622 | 7/2011 |
| JP | 2014-85384 | 5/2014 |
| KR | 10-2011-0023867 | 3/2011 |
| TW | 200813955 | 3/2008 |

OTHER PUBLICATIONS

Office Action mailed Feb. 29, 2016 in Korean Application No. 10-2014-0185931 (w/English translation).

* cited by examiner

[ 2.5Tr circuit ]

DISPLAY DEVICE

CROSS-REFERENCE TO RELATED APPLICATIONS

This application is based upon and claims the benefit of priority from Japanese Patent Application No. 2013-270960, filed Dec. 27, 2013, the entire contents of which are incorporated herein by reference.

FIELD

Embodiments described herein relate generally to a display device.

BACKGROUND

In recent years, the demand for flatpanel display devices such as a liquid crystal display device has rapidly grown because of the thinness, lightness, and energy-efficiency of such devices. Amongst others, an active-matrix display device is adopted in various devices including mobile information devices. The active-matrix display device includes a pixel switch which switches a pixel state between on-state and off-state electrically and holds an image signal on the on-state pixel in each pixel.

As such a flatpanel active-matrix display device, an organic electroluminescent (EL) display device using self-luminescent elements is now under keen research and development. The organic EL display device does not require a backlight, and is suitable for both movie playing use because of its rapid response and cold environmental use because of its luminosity which does not decrease even at a low temperature.

In general, the organic EL display device includes a plurality of pixels arranged in a plurality of rows and a plurality of columns. Each pixel is composed of an organic EL element which is a self-luminescent element and a pixel circuit which supplies a driving current to the organic EL element, and performs a display operation by controlling the luminance of the organic EL element.

As a driving method of a pixel circuit, a voltage signal driving method is well-known. Furthermore, there is proposed a high definition display device in which the number of lines and component elements of pixels are reduced to make a layout area of each pixel minute by adopting a structure which can switch a voltage power between low and high and output both an image signal and an initialization signal from an image signal line.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 1:
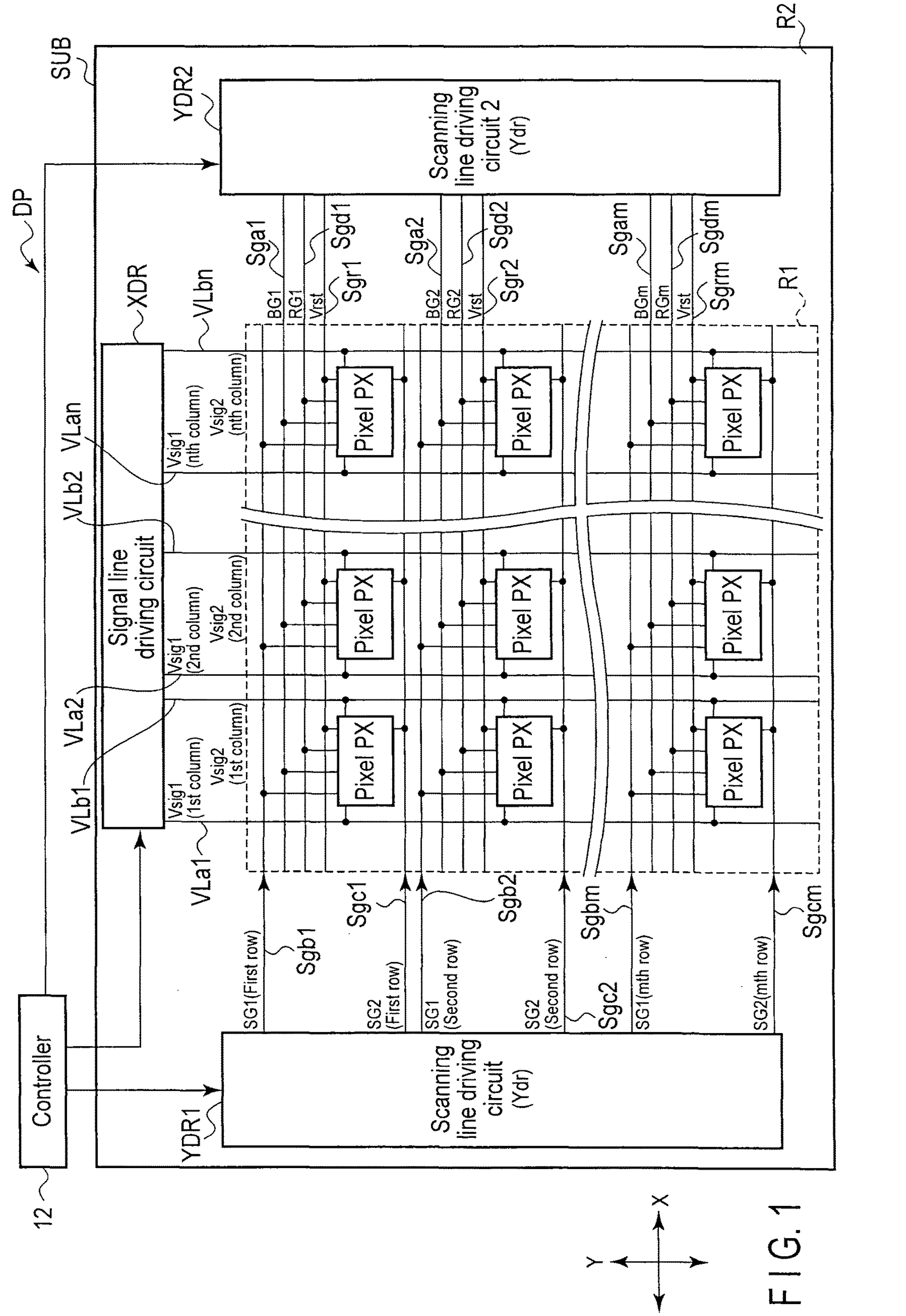
FIG. 1 is an exemplary plan view which schematically shows a display device of first embodiment.

Various embodiments will be described hereinafter with reference to the accompanying drawings.

According to one embodiment, a display device includes: a plurality of pixels each including a plurality of subpixels emitting light of different colors, the pixels arranged in a matrix on a substrate, each subpixel including a luminescent element and a pixel circuit to supply driving current to the luminescent element; a plurality of scanning lines arranged along rows in which the pixels are arranged; a plurality of image signal lines arranged along columns in which the pixels are arranged; a plurality of reset power source lines arranged along the rows or columns in which the pixels are arranged; a first power source line; a scanning line driving circuit to supply a control signal to the scanning lines sequentially and to perform a scan of the pixels row by row sequentially; and a signal line driving circuit to supply an image signal to the image signal lines in synchronization with each scan, wherein at least one subpixel comprises: an output switch of which first terminal is connected to the first power source line and of which control terminal is connected to a first scanning line; a driving transistor of which first terminal is connected to a second terminal of the output switch and of which second terminal is connected to one electrode of the luminescent element; a retaining capacitance connected between a control terminal and the second terminal of the driving transistor; a pixel switch of which first terminal is connected to the control terminal of the driving transistor, of which second terminal is connected to the image signal line, and of which control terminal is connected to a second scanning line; and a reset switch of which first terminal is connected to the reset power source line, of which second terminal is connected to the first terminal or the second terminal of the driving transistor, and of which control terminal is connected to a third scanning line, and the output switch is shared with a plurality of subpixels included in at least one pixel.

Hereinafter, embodiments are described with reference to the accompanying drawings.

Note that the disclosure herein is for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the Figures for the sake of simpler explanation as compared to actual embodiments, and they are not to limit the interpretation of the invention of the present application. Furthermore, in the description and Figures of the present application, structural elements having the same or similar functions will be referred to by the same reference numbers and detailed explanations of them that are considered redundant may be omitted.

In the embodiments, the display device is an active-matrix display device, or more specifically, an active-matrix organic EL display device.

First Embodiment

FIG. 1 is a plan view which schematically shows a display device of the first embodiment. As shown in FIG. 1, the display device of the first embodiment is an active-matrix display device of 2-inch or more and includes a display panel DP and a controller 12 which controls the display panel DP function. In this embodiment, the display panel DP is an organic EL panel.

The display panel DP includes an insulating substrate SUB which has light transmittance such as a glass plate, m×n pixels PX arranged in a matrix on a rectangular display region R1 of the insulating substrate SUB, a plurality of first scanning lines Sga (1 to m), a plurality of second scanning lines Sgb (1 to m), a plurality of third scanning lines Sgc (1 to m), a plurality of fourth scanning lines Sgd (1 to m), a plurality of reset power lines Sgr (1 to m), a plurality of image signal lines VLa (1 to n), and a plurality of image signal lines VLb (1 to n).

The pixel PX is, for example, an RGBW square pixel (a pixel in which four subpixels SPX of RGBW are in a square arrangement). M denotes the number of pixels arranged along a column direction Y while n denotes the number of pixels arranged along a row direction X. First scanning line Sga, second scanning line Sgb, third scanning line Sgc, fourth scanning line Sgd, and reset power line Sgr are arranged to extend in the row direction X. Image signal lines VLa and VLb are arranged to extend in the column direction Y.

First scanning line Sga (1 to m) outputs control signals BG (1 to m). Second scanning line Sgb (1 to m) and third scanning line Sgc (1 to m) output control signals SG1 (1 to m) and control signals SG2 (1 to m), respectively. Fourth scanning line Sgd (1 to m) outputs reset signals RG (1 to m). Reset power line Sgr (1 to m) outputs reset voltage Vrst. Image signal line VLa (1 to n) and image signal line VLb (1 to n) output gradation voltage signals Vsig1 (1 to n) and gradation voltage signals Vsig2 (1 to n), respectively.

The display panel DP includes scanning line driving circuits YDR1 and YDR2 which sequentially drive the first scanning line Sga, second scanning line Sgb, third scanning line Sgc, and fourth scanning line Sgd in each row of a pixel PX, and signal line driving circuit XDR which drives the image signal lines VLa and VLb. Scanning line driving circuits YDR1 and YDR2 and signal line driving circuit XDR are formed integrally on a non-display region R2 outside the display region R1 of the insulating substrate SUB.

Figure 2:
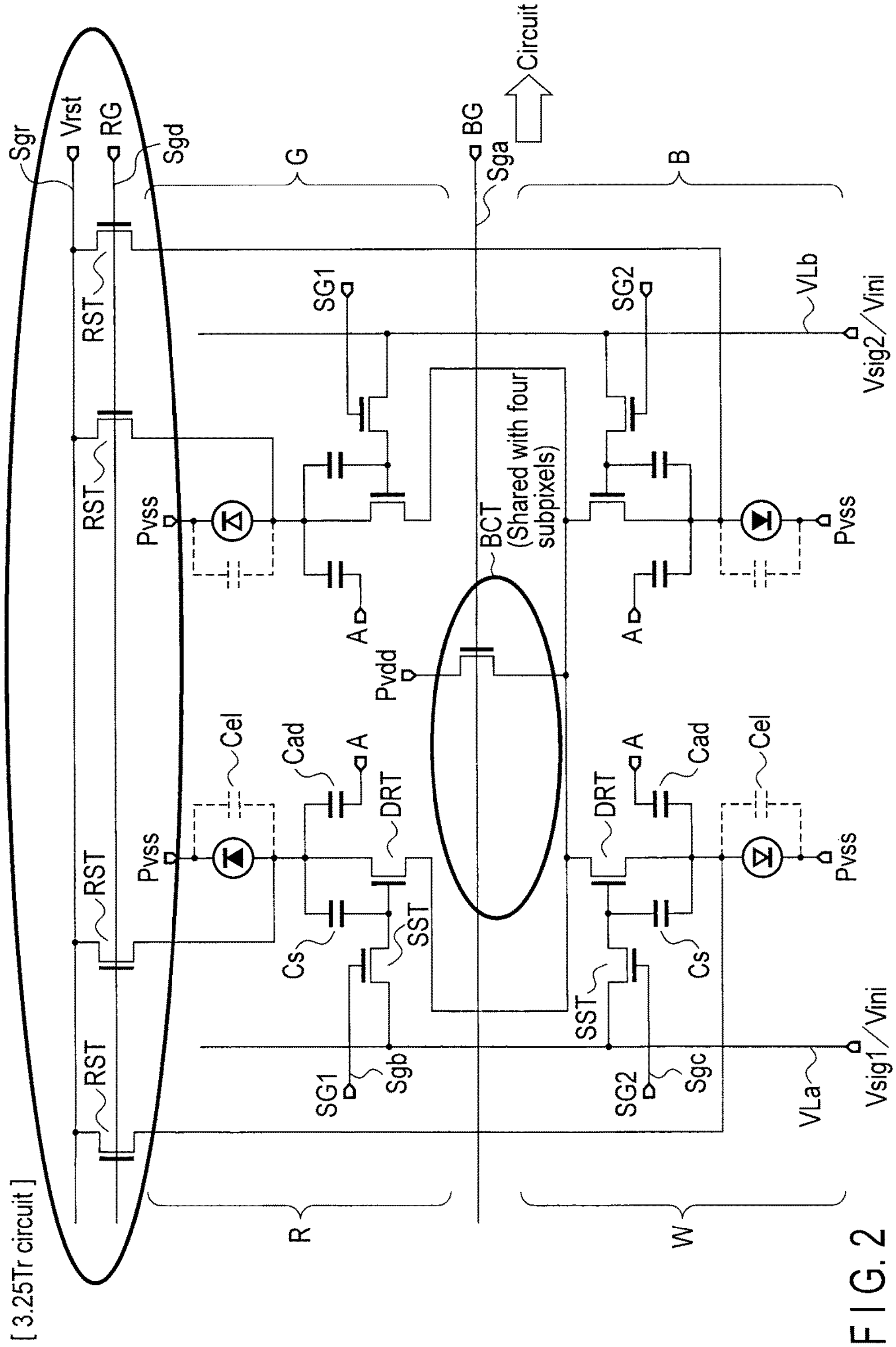
FIG. 2 is an exemplary view which shows an equivalent circuit of a pixel of the display device of the first embodiment.

FIG. 2 shows an equivalent circuit of the pixel PX of the display device of FIG. 1.

The pixel PX is, as mentioned above, an RGBW square pixel, and in general, includes a red (R) subpixel SPX at its upper left part, a green (G) subpixel SPX at its upper right part, a colorless (W) subpixel SPX at its lower left part, and a blue (B) subpixel SPX at its lower right part. Note that, as described in detail later, a single output switch BCT is shared with the four subpixels SPX while four reset switches RST are provided with the four subpixels SPX, respectively.

Figure 3:
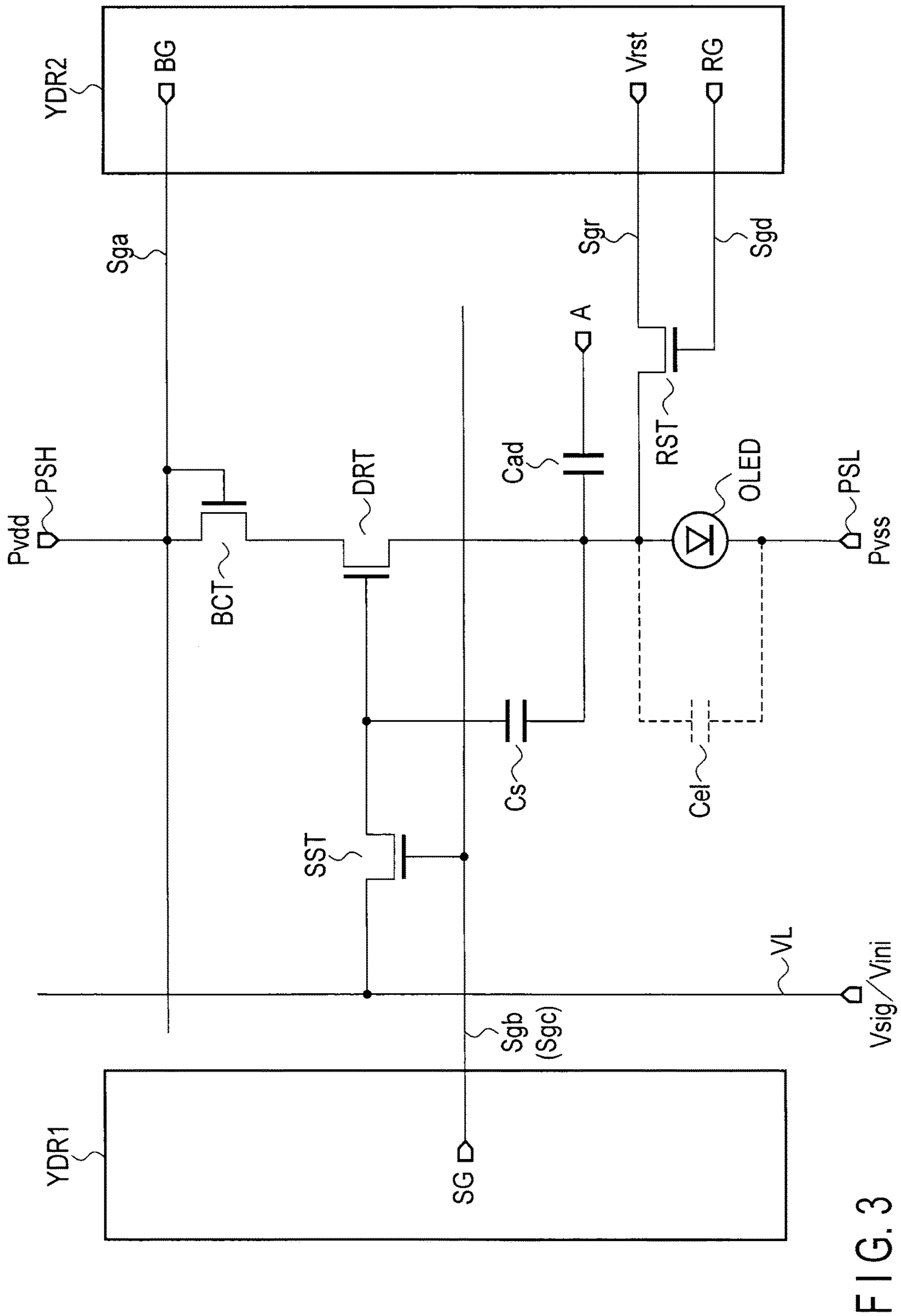
FIG. 3 is an exemplary view which shows an equivalent circuit of a subpixel of the pixel of the display device of the first embodiment.

FIG. 3 shows an equivalent circuit of a subpixel SPX of a pixel PX.

Now, the structure and function of subpixel SPX are explained with reference to FIGS. 2 and 3.

Each subpixel SPX comprises an organic light-emitting diode display element (hereinafter simply referred to as an OLED) and a pixel circuit which supplies driving current to the display element. As shown in FIG. 3, the pixel circuit of each subpixel SPX is a voltage signal type circuit which controls luminescence of the OLED based on an image signal composed of voltage signals. The pixel circuit includes a pixel switch SST, driving transistor DRT, output switch BCT, reset switch RST, retaining capacitance Cs, and auxiliary capacitance Cad. Note that the auxiliary capacitance Cad is an element provided for the purpose of adjusting luminescent current. The OLED functions as a capacitor and includes capacitance Cel of the OLED itself (parasitic capacitance of the OLED).

Note that each subpixel SPX shares the output switch BCT with the others. That is, four adjacent subpixels SPX in both the row direction X and the column direction Y share a single output switch BCT. Furthermore, both a high potential Pvdd from a high-potential power line PSH and a low potential (fixed potential) Pvss from a low-potential power line PSL are supplied to the subpixel SPX.

The pixel switch SST, driving transistor DRT, output switch BCT, and reset switch RST are, in this case, composed of the same type of thin-film transistor (TFT), for example, an N-channel TFT. Furthermore, the TFT used in each of the driving transistor and switches is produced through the same process and includes the same layer structure, which is namely a top gate structure thin-film transistor using polysilicon in a semiconductor layer.

Each of the pixel switch SST, driving transistor DRT, output switch BCT, and reset switch RST includes a first terminal, second terminal, and control terminal. In the first embodiment, the first terminal is the source electrode, the second terminal is the drain electrode, and the control terminal is the gate electrode.

The driving transistor DRT, the output switch BCT and the OLED are connected in series between the high-potential power line PSH and the low-potential power line PSL. The high potential Pvdd is set to, for example, 10 V and the low potential Pvss is set to, for example, 1.5 V.

Referring to the output switch BCT, the drain electrode is connected to the high-potential power line PSH, the source electrode is connected to the drain electrode of the driving transistor DRT, and the gate electrode is connected to the first scanning line Sga. With this connection structure, the output switch BCT is caused to conduct (to be on) or not conduct (to be off) by the control signal from the first scanning line Sga. The output switch BCT controls the period of luminescence of the OLED in response to control signal BG.

Referring to the driving transistor DRT, the drain electrode is connected to the source electrode of the output switch BCT, and the source electrode is connected to one electrode (a positive electrode in this case) of the OLED. The other electrode (a negative electrode in this case) of the OLED is connected to the low-potential power line PSL. The driving transistor DRT outputs driving current corresponding to gradation voltage signals Vsig (Vsig1 and Vsig2) to the OLED.

Referring to the pixel switch SST, the source electrode is connected to the image signal line VL, the drain electrode is connected to the gate electrode of the driving transistor DRT, and the gate electrode is connected to the second scanning line Sgb (third scanning line Sgc) which functions as a signal write controlling gate line. The pixel switch SST is caused to conduct or not conduct (to be on or off) by control signals SG (SG1 and SG2) supplied from the second scanning line Sgb. Then, the pixel switch SST controls connection and disconnection between the pixel circuit and the image signal line VL (VLa and VLb) in response to control signals SG and takes the gradation voltage signal Vsig from its corresponding image signal line VL into the pixel circuit.

The reset switch RST is connected between the source electrode of the driving transistor DRT and a reset power source (not shown). Referring to the reset switch RST, the source electrode is connected to the reset power line Sgr which is connected to the reset power source, the drain electrode is connected to the source electrode of the driving transistor DRT, and the gate electrode is connected to the fourth scanning line Sgd. As mentioned above, the reset power line Sgr is fixed to the reset voltage Vrst which is a constant potential.

The reset switch RST is switched on/off to start/stop supplying the reset voltage Vrst corresponding to the reset signals RG supplied through the fourth scanning line Sgd.

When the rest switch RST is switched on, the potential of the source electrode of the driving transistor DRT is initialized.

Note that one end of the auxiliary capacitance Cad is connected to the source electrode of the driving transistor DRT and the other end is connected to a fixed potential A of which potential is stable. The other end of the auxiliary capacitance Cad may be connected to the high-potential power line PSH (or a conductive layer OE described later), or low-potential power line PSL (or a counterelectrode CE described later), or reset power line Sgr as long as the potential of the connection target line is stable.

In the circuitry of the pixel PX shown in FIG. 2, the four subpixels SPX are composed of a total of thirteen TFTs. That is, 3.25 (=13/4) TFTs are used per subpixel SPX. This value of 3.25 represents the number of structural elements in a pixel which can be interpreted as an index for high definition. Thus, the circuitry depicted in FIG. 2 is referred to as 3.25 Tr circuitry.

In contrast, the controller 12 shown in FIG. 1 is formed on a printed circuit board (not shown) disposed outside the display panel DP and controls scanning line driving circuits YDR1 and YDR2 and the signal line driving circuit XDR. The controller receives a digital image signal and a synchronization signal those are supplied externally, and based on the synchronization signal, generates a vertical scanning control signal used to control a vertical scanning timing and a horizontal scanning control signal used to control a horizontal scanning timing.

Then, the controller 12 supplies the vertical scanning control signal and the horizontal scanning control signal to scanning line driving circuits YDR1 and YDR2 and the signal line driving circuit XDR, and supplies the digital image signal and the initialization signal to the signal line driving circuit XDR in synchronism with the horizontal and vertical scanning timings.

Under the control of the horizontal scanning control signal, the signal line driving circuit XDR converts the image signals sequentially obtained in horizontal scanning periods into an analog format and supplies the gradation voltage signals Vsig corresponding to respective gradations to a plurality of image signal lines VL in parallel. Furthermore, the signal line driving circuit XDR supplies an initialization signal Vini to the image signal line VL.

Scanning line driving circuits YDR1 and YDR2 include a shift register, output buffer, and the like (not shown). Scanning line driving circuits YDR1 and YDR2 transfer vertical scanning starting pulses supplied externally one after another to their successors, and supplies three kinds of control signals to the subpixel SPX of each row through the output buffer, the three control signals are control signals BG, SG1 (or SG2), and RG. Note that the reset voltage Vrst is supplied from the reset power line Sgr at a certain timing corresponding to the reset signal RG.

Figure 4:
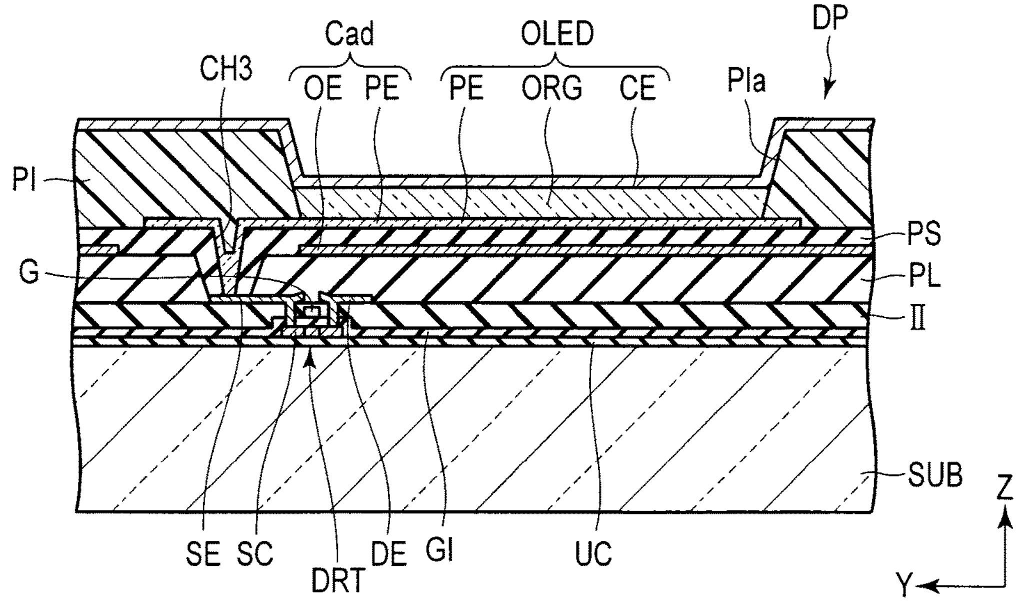
FIG. 4 is an exemplary partial cross-sectional view which schematically shows a structural example applicable to the display device of the first embodiment.

FIG. 4 is a partial cross-sectional view which schematically shows an example of the structure adoptable in the display device of FIG. 1. Note that, in FIG. 4, the display device is depicted in such a manner that its display surface, in other words, its front surface or its light emitting surface looks up and its rear surface looks down. The display device is an organic EL display device of the upper surface luminescence type in which the active-matrix driving scheme is used.

Now, how the driving transistor DRT and the OLED are structured is explained in detail with reference to FIG. 4.

An N-channel TFT forming the driving transistor DRT includes a semiconductor layer SC. The semiconductor layer SC is formed in an undercoat layer UC on the insulating substrate SUB. The semiconductor layer SC is, for example, a polysilicon layer containing a p-type region and an n-type region.

The semiconductor layer SC is covered with a gate insulating film GI. A first conductive layer is formed on the gate insulating film GI. The first conductive layer may be a gate electrode G of the driving transistor DRT, for instance. The gate electrode G is opposed to the semiconductor layer SC. An interlayer insulating film II is formed on both the gate insulating film GI and the gate electrode G.

A second conductive layer is formed on the interlayer insulating film II. The second conductive layer may be a source electrode SE or a drain electrode DE, for instance. The source electrode SE and the drain electrode DE are connected to the source region and the drain region of the semiconductor layer SC, respectively, through a contact hole formed in the interlayer insulating film II and the gate insulating film GI.

An insulating planarization film PL is formed on the interlayer insulating film II, source electrode SE, and drain electrode DE. The planarization film PL functions as the first insulating film. In other words, the planarization film PL is disposed above a plurality of semiconductor layers, first conductive layer, and second conductive layer those are separated from each other.

A third conductive layer is formed on the planarization film PL. The third conductive layer may be a conductive layer OE. In this embodiment, the conductive layer OE is formed of a metal (for example, aluminum, Al). A passivation film PS is formed on the planarization film PL and the conductive layer OE. The passivation film PS functions as a second insulating film.

A fourth conductive layer is formed on the passivation film PS and a fifth conductive layer is formed on the fourth conductive layer. The OLED includes a pixel electrode PE functioning as the fourth conductive layer, organic material layer ORG, and counterelectrode CE functioning as the fifth conductive layer. In this embodiment, the pixel electrode PE is a positive electrode and the counterelectrode CE is a negative electrode.

The pixel electrode PE is formed on the passivation film PS. The pixel electrode PE is connected to the source electrode SE through a contact hole CH3 provided with the passivation film PS and a contact hole provided with the planarization film PL. The pixel electrode PE is a rear surface electrode which has a light reflectivity. The pixel electrode PE is a combination of a transparent electrode layer and a light reflective electrode layer (for example, Al). The transparent electrode layer may be formed of indium tin oxide (ITO) or indium zinc oxide (IZO).

When the pixel electrode PE is formed, a transparent conductive material is deposited on the passivation film PS, and then, a light reflective conductive material is deposited. After that, patterning is performed using a photolithography method to produce the pixel electrode PE.

On the passivation film PS, a partition insulating layer PI is further formed. A through hole (bank) is provide with the partition insulating layer PI at a position corresponding to the pixel electrode PE, or, a slit is provided with a position of a column or a row formed by the pixel electrode PE. In the example depicted, the partition insulating layer PI has a through hole PIa at its position corresponding to the pixel electrode PE.

On the pixel electrode PE, an organic material layer ORG containing a luminescent layer is formed as an active layer. The luminescent layer is, for example, a thin film containing a luminescent organic compound which exhibits red, green, blue or achromatic luminous color. The organic material layer ORG may contain, in addition to the luminescent layer, a hole injection layer, hole transportation layer, hole blocking layer, electron transportation layer, and electron injection layer.

Note that the above mentioned four luminous colors of red, green, blue and achromatic of the OLED are not essential and the OLED may exhibit an achromatic luminous color alone. In that case, the luminous colors of red, green, blue and achromatic can be exhibited by combining the OLED with a color filter of red, green or blue.

The partition insulating layer PI and the organic material layer ORG are covered with the counterelectrode CE. In the example depicted, the counterelectrode CE is connected to the other counterelectrodes CE between the pixels PX, that is, is a common electrode. Furthermore, in the example depicted, the counterelectrode CE is a negative electrode and a light transmissive front surface electrode. The counterelectrode CE is formed of, for example, ITO or IZO. The counterelectrode CE is electrically connected to the low-potential power line PSL (not shown) with a rectangular frame shape non-display region R2.

In the OLED with such a structure, the hole injected from the pixel electrode PE and the electron injected from the counterelectrode CE are recoupled with each other inside the organic material layer ORG, and at that time, an exiton is generated by the excitiation of the organic molecules of the organic material layer ORG. The exiton emits light in the process of its deactivation, and the light from the organic material layer ORG is released outside through the transparent counterelectrode CE.

Figure 5:
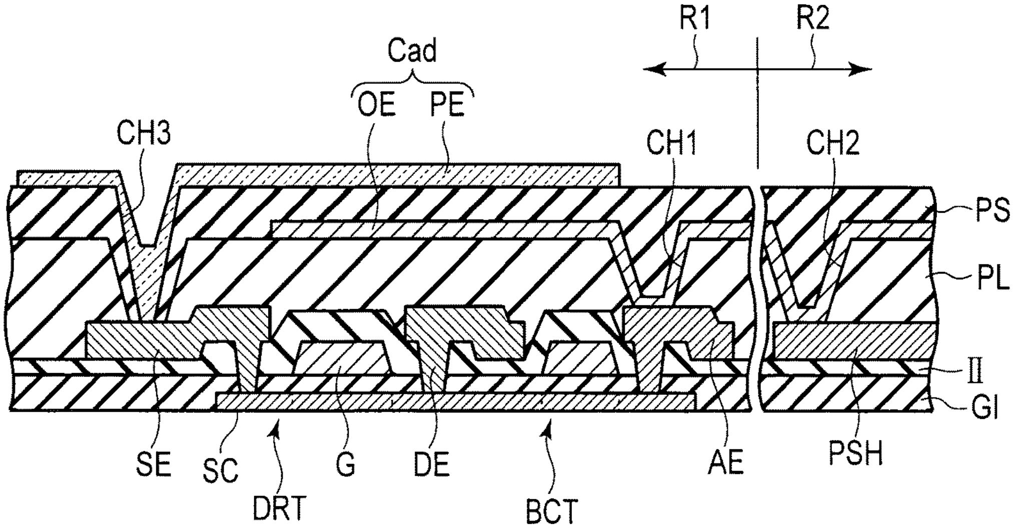
FIG. 5 is an exemplary partial cross-sectional view which shows the display device of the first embodiment, in which a driving transistor, output switch, high-potential power line, and auxiliary capacitance are depicted.

FIG. 5 is a partial cross-sectional view which shows the display device of the first embodiment. Specifically, FIG. 5 shows the driving transistor DRT, output switch BCT, high-potential power line PSH, and auxiliary capacitance Cad. Now, the structure of the auxiliary capacitance Cad is explained in detail with reference to FIGS. 4 and 5.

The conductive layer OE and the pixel electrode PE face each other and form the auxiliary capacitance Cad (capacitance part). The potential of the conductive layer OE is fixed to the high potential Pvdd. The auxiliary capacitance Cad can be formed without using a semiconductor layer. The auxiliary capacitance Cad is thus formed in a region opposed to the element using a semiconductor layer which means that the auxiliary capacitance Cad can be positioned efficiently. Consequently, the space utilization can be improved.

Furthermore, in this embodiment, since the display device is of the upper surface luminescence type, the conductive layer OE can be formed of a metal (for example, Al). In contrast, a display device of the lower surface luminescence type and a light-transmissive display device such as a liquid crystal display device cannot include a conductive layer OE which is formed of a metal material.

Now, operations of the organic EL display device of FIG. 2 are explained.

Figure 6:
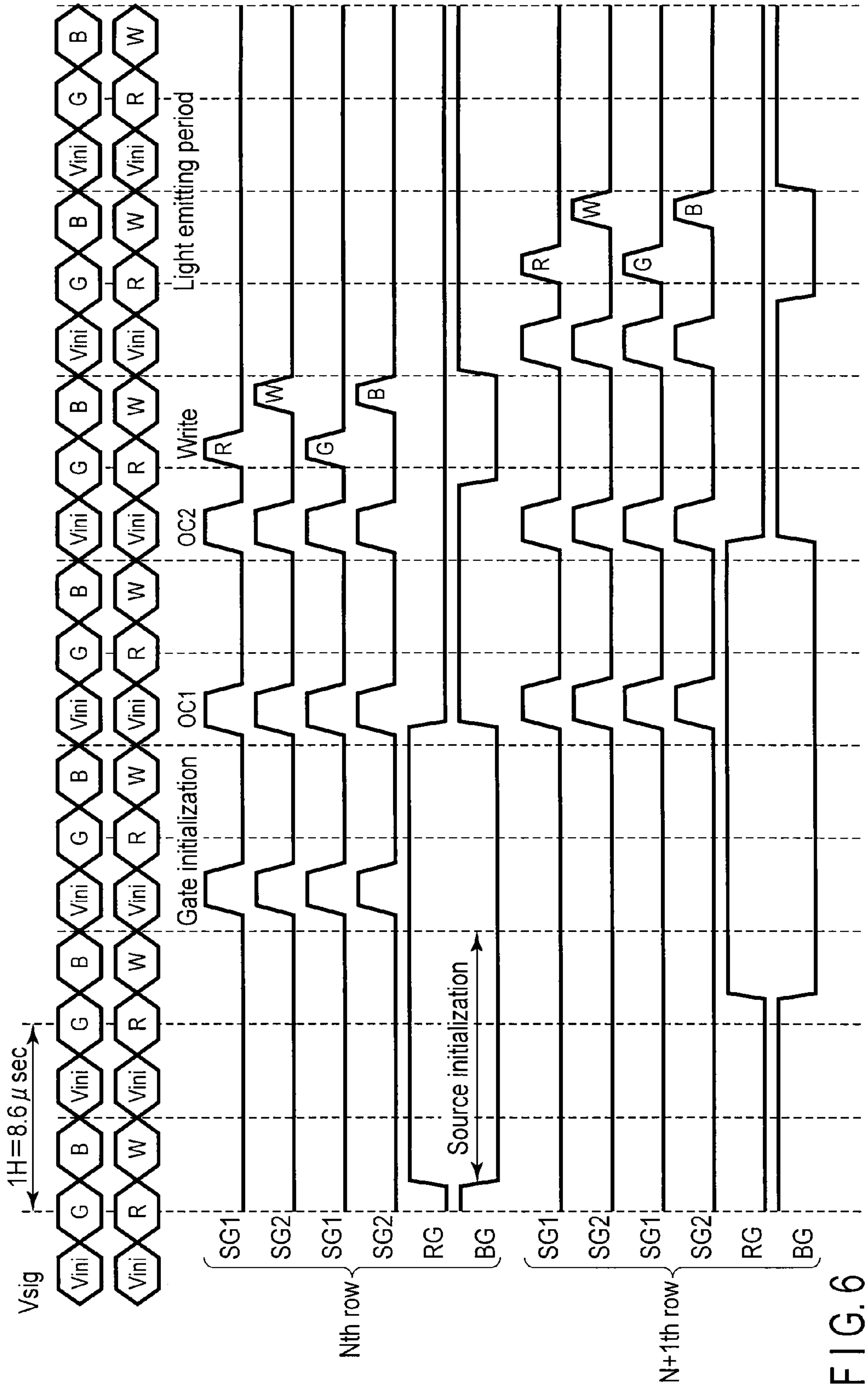
FIG. 6 is an exemplary timing chart which shows control signals of a scanning line driving circuit of the display device of the first embodiment during a displaying operation.

FIG. 6 is a timing chart which shows control signals in scanning line driving circuits YDR1 and YDR2 during the displaying operation.

Scanning line driving circuits YDR1 and YDR2 generate pulses each having a width corresponding to each horizontal scanning period based on the start signal and clock, and output the pulses as control signals BG (1 to m), SG1 (1 to m), SG2 (1 to m), and reset signals RG (1 to m). The operation of the pixel circuit may be subdivided into a source initialization operation, gate initialization operation, offset cancel (OC) operation, image signal write operation, and luminescence operation.

[Source Initialization Operation]

Initially, the source initialization operation is performed. In the source initialization operation, from scanning line driving circuits YDR1 and YDR2, control signals SG1 and SG2 are set to a level (off-potential, which means a low level here) which causes the pixel switch SST not to conduct, control signals BG are set to a level (off-potential, which means a low level here) which causes the output switch BCT not to conduct, and the reset signals RG are set to a level (on-potential, which means a high level here) which causes the reset switch RST to conduct.

When the output switch BCT and the pixel switch SST are caused not to conduct and the reset switch RST is caused to conduct, the source initialization operation is initiated. By causing the reset switch RST to conduct, the source and drain of the driving transistor DRT have the same potential as the reset voltage Vrst, and the source initialization operation is completed. Here, the reset voltage Vrst is set to, for example, −2 V.

[Gate Initialization Operation]

Next, the gate initialization operation is performed. In the gate initialization operation, from scanning line driving circuits YDR1 and YDR2, control signals SG1 and SG2 are set to a level (on-potential, which means a high level here) which causes the pixel switch SST to conduct, control signals BG are set to a level (off-potential, which means a low level here) which causes the output switch BCT not to conduct, and the reset signals RG are set to a level (on-potential, which means a high level here) which causes the reset switch RST to conduct.

When the output switch BCT is caused not to conduct and the pixel switch SST and the reset switch RST are caused to conduct, the gate initialization operation is initiated. During this gate initialization period, initialization voltage Vini output from the image signal lines VL (VLa and VLb) is applied to the gate of the driving transistor DRT through the pixel switch SST. Through this process, the gate potential of the driving transistor DRT is reset to a potential corresponding to the initialization voltage Vini and the information of a previous frame is initialized. Here, the initialization voltage Vrst is set to, for example, 2 V.

[Offset Cancel Operation]

Subsequently, offset cancel (OC1 and OC2) function is performed. Control signals SG1 and SG2 are set to the on-potential (high), control signals BG are set to the on-potential (high), and the reset signals RG are set to off-potential (low). Through this process, the reset switch RST is caused not to conduct and the pixel switch SST and the output switch BCT are caused to conduct and the offset cancel operation of a threshold is initiated.

During the offset cancel (OC1 and OC2) period, the initialization voltage Vini output from the image signal line VL is applied and fixed to the gate potential of the driving transistor DRT through the pixel switch SST. Furthermore, with the output switch BCT caused to conduct, current from the high-potential power line PSH flows into the driving transistor DRT. The source potential of the driving transistor DRT takes a reset voltage Vrst written during a reset period as its initial value, gradually reduces the current flowing through the drain-source of the driving transistor DRT, and shifts to the high-potential side, absorbing/compensating for TFT characteristic variations of the driving transistor. In the first embodiment, the offset cancel period is set to approximately 1 μs.

At the time of the offset cancel period completion, the source potential of the driving transistor DRT is set to, approximately, Vini-Vth. Note that Vth is a threshold voltage of the driving transistor DRT. Then, the voltage between the gate and the source of the driving transistor DRT reaches to the cancel point and a potential difference corresponding to the cancel point is charged in the retaining capacitance Cs.

Note that FIG. 6 shows a case where there are two offset cancel periods but the number of periods is not limited thereto, and one or more offset cancel periods may be adopted.

[Image Signal Write Operation]

In the subsequent image signal write period, control signals SG1 and SG2 are set to a level (on-potential, which means a high level here) which causes the pixel switch SST to conduct, control signal BG is set to a level which causes the output switch BCT not to conduct, and the reset signal RG is set to a level which causes the reset switch RST not to conduct.

The pixel switch SST and the output switch BCT are caused to conduct and the reset switch RST is caused not to conduct, and thus, the image signal write operation is initiated.

During the image signal write period, image voltage signals Vsig1 and Vsig2 from the image signal lines VLa and VLb are individually written to the gate of the driving transistor DRT through the pixel switch SST. That is, at the same time control signal SG1 is set to the on-potential, the red (R) and green (G) gradation voltage signals Vsig1 and Vsig2 are output to the image signal lines VLa and VLb, respectively. Then, at the same time control signal SG2 is set to the on-potential, the white (W) and blue (B) gradation voltage signals Vsig1 and Vsig2 are output to the image signal lines VLa and VLb, respectively.

Furthermore, current from the high-potential power line PSH passes through the driving transistor DRT and the parasitic capacitance Cel of the OLED, and flows into the low-potential power line PSL. Immediately after the pixel switch SST is caused to conduct, the gate potential of the driving transistor DRT is set to Vsig (Vsig1 and Vsig2) and the source potential of the driving transistor DRT is set to Vini−Vth+Cs (Vsig−Vini)/(Cs+Cel+Cad).

Then, the current flows into the low-potential power line PSL via the parasitic capacitance Cel. When the image signal write period ends, the gate potential of the driving transistor DRT becomes Vsig, and the source potential of the driving transistor DRT becomes Vini−Vth+ΔV1+Cs (Vsig−Vini)/(Cs+Cel+Cad). Thus, the variations in mobility of the driving transistor DRT can be adjusted.

Note that the output switch BCT is caused not to conduct during the image signal write period shown in FIG. 6. This is for a write operation of the image voltage signal Vsig without performing a mobility adjustment which is described later. This simplifies the structure of the driving circuit and reduces the frame size, and thus, is advantageous to produce a high definition display device.

However, the mobility adjustment is effective for reducing poor displaying quality due to the variations in mobility of the driving transistor. Thus, the output switch BCT may be caused to conduct during the image signal write period in FIG. 6 for the mobility adjustment. Whether or not the output switch BCT is caused to conduct is determined depending on a design concept of the display device. Therefore, the display device of the present embodiment may be structured such that the output switch BCT is caused to conduct, rather than not to conduct, during the image signal write period.

[Luminescence Operation]

In the luminescence operation, control signals SG1 and SG2 are set to a level (off-potential, which means a low level here) which causes the pixel switch SST not to conduct, control signals BG are set to a level (on-potential, which means a high level here) which causes the output switch BCT to conduct, and the reset signals RG are set to a level (off-potential, which means a low level here) which causes the reset switch RST to conduct.

When the output switch BCT is caused to conduct and the pixel switch SST and the reset switch RST are caused not to conduct, the luminescence operation is initiated.

The driving transistor DRT outputs driving current Ie of which current corresponds to gate control voltage written to the retaining capacitance Cs. The driving current Ie is supplied to the OLED which emits light at the luminance corresponding to the driving current Ie. This is the luminescence operation. The OLED maintains its luminescence until control signal BG is set to the off-potential after a single frame period.

The above-described source initialization, gate initialization, offset cancel, image signal write, and luminescence operations are sequentially repeated in each display pixel to display a desired image.

In the display device structure above, in a saturation region of the driving transistor DRT, the driving current, Ie, flowing into the OLED is given by $$Ie=\beta\times\{(V\mathrm{sig}-V\mathrm{ini}-\Delta V1)\times\mathrm{Cel}/(Cs+\mathrm{Cel}+\mathrm{Cad})\}^2,$$

where β=μ·CoxW/2L, W being the channel width and L being the channel length.

Thus, the current does not depend on a threshold Vth of the driving transistor DRT. Any possible affection by variations of the threshold of the driving transistor DRT can be removed.

Note that, if the output switch BCT is caused to conduct during the write period, ΔV1 can be changed. The absolute value of ΔV1 becomes greater with increased mobility in the driving transistor DRT, and thus, the influence of the mobility can be compensated for. Note that the mobility adjustment is dependent on time, and if it progresses too long, overadjustment will occur.

The above process prevents problems such as poorness, non-uniformity, and roughness in the display quality due to the variations in the threshold value of and mobility in the driving transistor DRT, and provides a high-quality image display which realizes a high-definition active-matrix display device with improved display quality.

Figure 7:
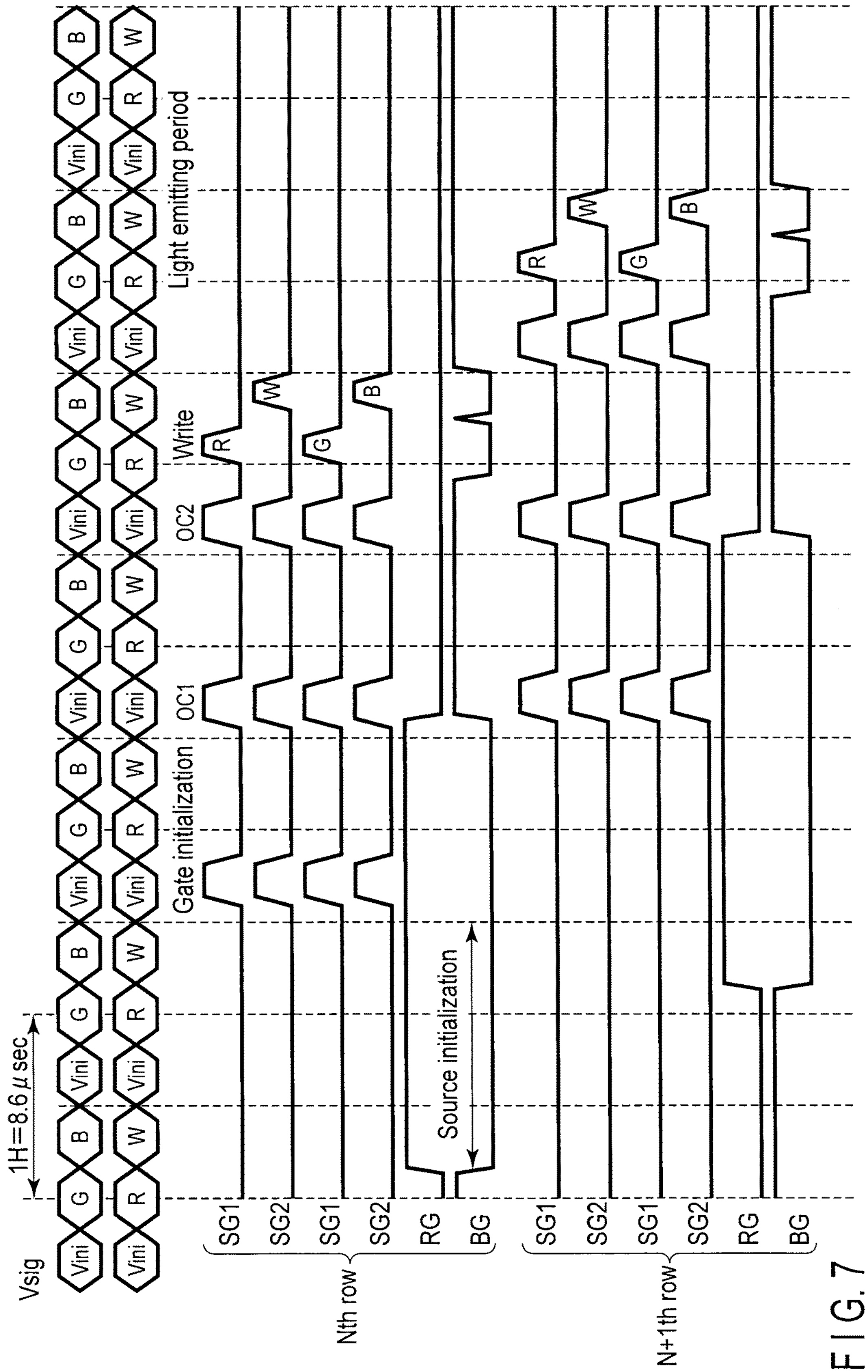
FIG. 7 is an exemplary timing chart which shows control signals of a scanning line driving circuit of a variation of the display device of the first embodiment during the displaying operation.

FIG. 7 is a timing chart which shows control signals of scanning line driving circuits YDR1 and YDR2 of a variation of the display device of the first embodiment during the displaying operation. In FIG. 7, during the write period, control signal BG is set to a level which causes the output switch BCT not to conduct each time control signals SG1 and SG2 cause the pixel switch SST to conduct, and causes the output switch BCT to conduct each time control signals SG1 and SG2 cause the pixel switch SST not to conduct.

Figure 8:
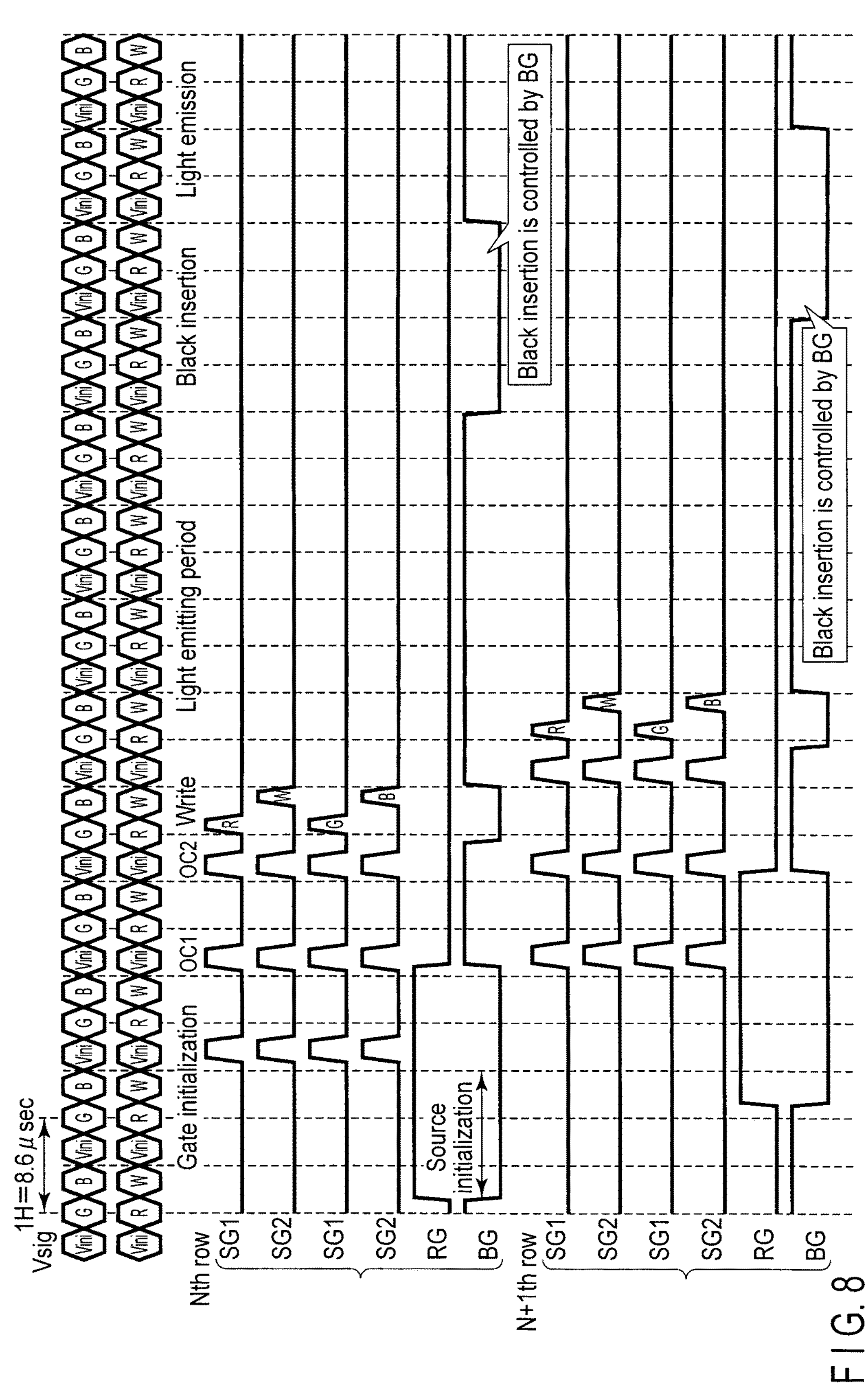
FIG. 8 is an exemplary timing chart which shows control signals of a scanning line driving circuit of the display device of the first embodiment during a black insertion operation.

FIG. 8 is a timing chart which shows control signals of scanning line driving circuits YDR1 and YDR2 of the display device at the time of black insertion. In FIG. 8, the black insertion is achieved by setting control signal BG to a level (off-potential, which means a low level here) which causes the output switch BCT not to conduct. With such a structure, a black insertion operation can be easily achieved and the luminance adjustment is performed effectively.

Second Embodiment

Figure 9:
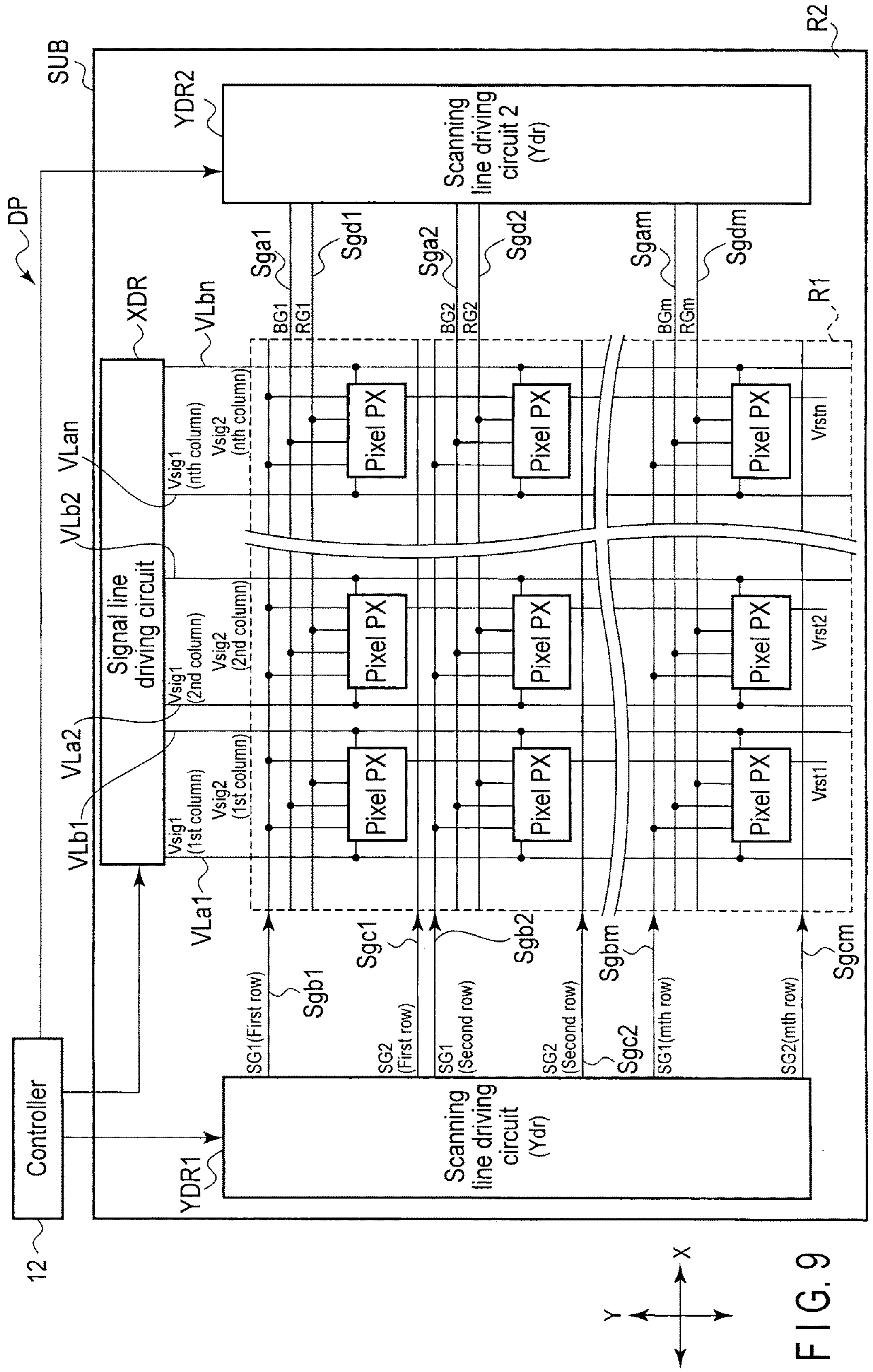
FIG. 9 is an exemplary plan view which schematically shows a display device of second embodiment.

FIG. 9 is a plan view which schematically shows a display device of second embodiment. The second embodiment differs from the first embodiment in respect of the arrangement of the reset power lines Sgr. The structural elements which are the same or have the same function as those of the first embodiment will be referred to by the same reference numbers and detailed descriptions of them will be omitted.

Figure 10:
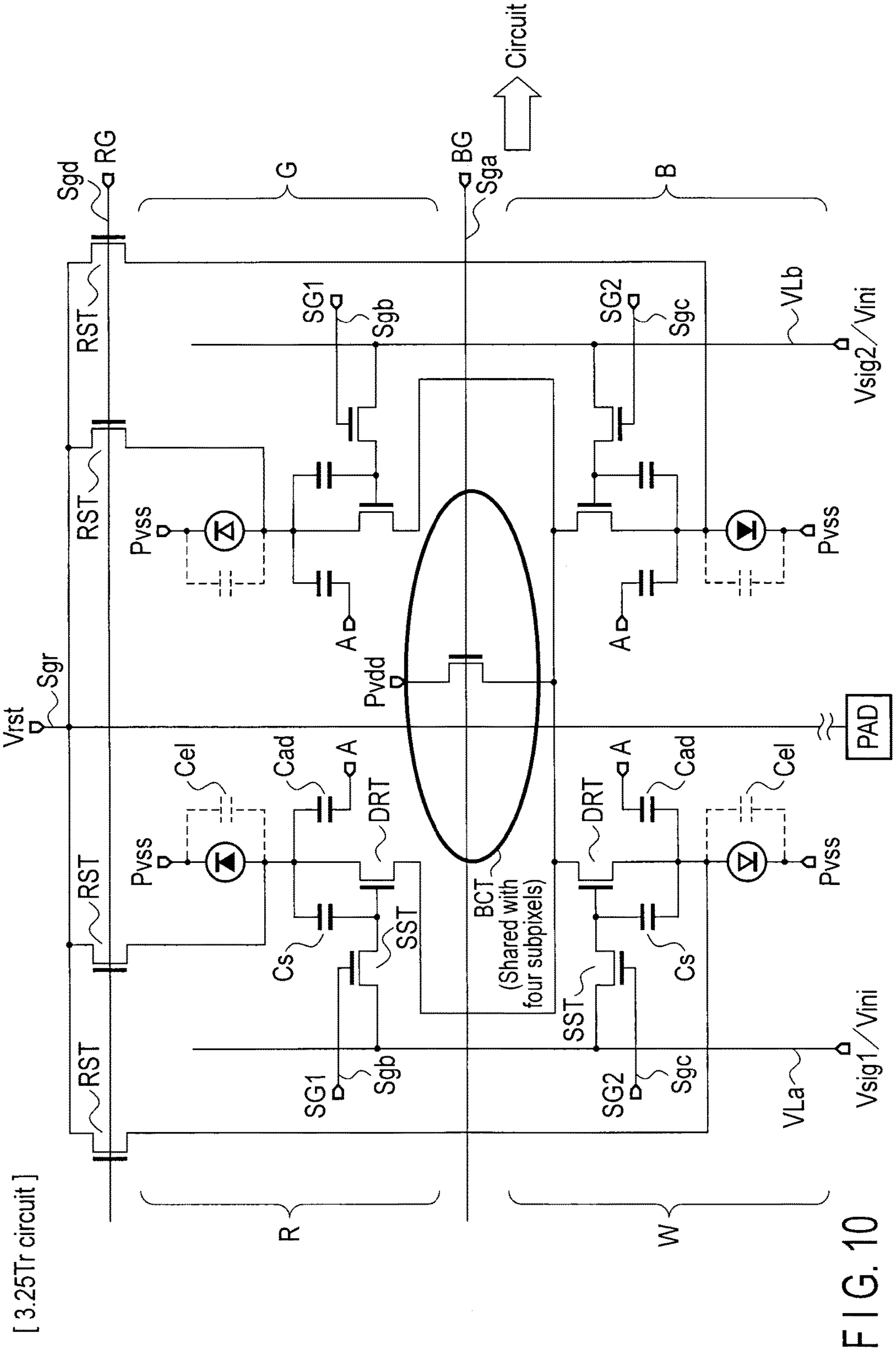
FIG. 10 is an exemplary view which shows an equivalent circuit of a pixel of the display device of the second embodiment.

FIG. 10 is a view which shows an equivalent circuit of the pixel PX of the display device in FIG. 9. In the example depicted in FIG. 10, the reset power line Sgr is arranged in parallel with the image signal lines VL (arranged vertically) instead of the first scanning line Sga (arranged transversely).

If the reset power line Sgr is arranged transversely, it is arranged on the same layer on which the first to fourth scanning lines are arranged, and thus, it is difficult to suppress the resistance of the reset power line Sgr because of the arrangement limitation. On the other hand, if the reset power line Sgr is arranged vertically, it can be arranged on the same layer on which the image signal lines VL (VLa and VLb) are arranged, and thus, it is possible to suppress the resistance of the reset power line Sgr because of less arrangement limitation.

Furthermore, in the structure of FIG. 10, the characteristics of the driving transistor DRT and the OLED can be measured although the measurement must be performed subpixel SPX by subpixel SPX. For example, a case where a pad PAD to input/output signals is provided with the periphery of the insulating substrate SUB and a reset switch RST in a single subpixel SPX is caused to conduct is now considered. Therein, the reset power line Sgr is connected to the source electrode of the driving transistor DRT and the positive electrode of the OLED via the conducting reset switch RST. Thus, the characteristics of the driving transistor DRT when high potential Pvdd is applied to the drain electrode can be measured and the characteristics of the OLED when low potential Pvss is applied to the negative electrode can be measured.

Figure 11:
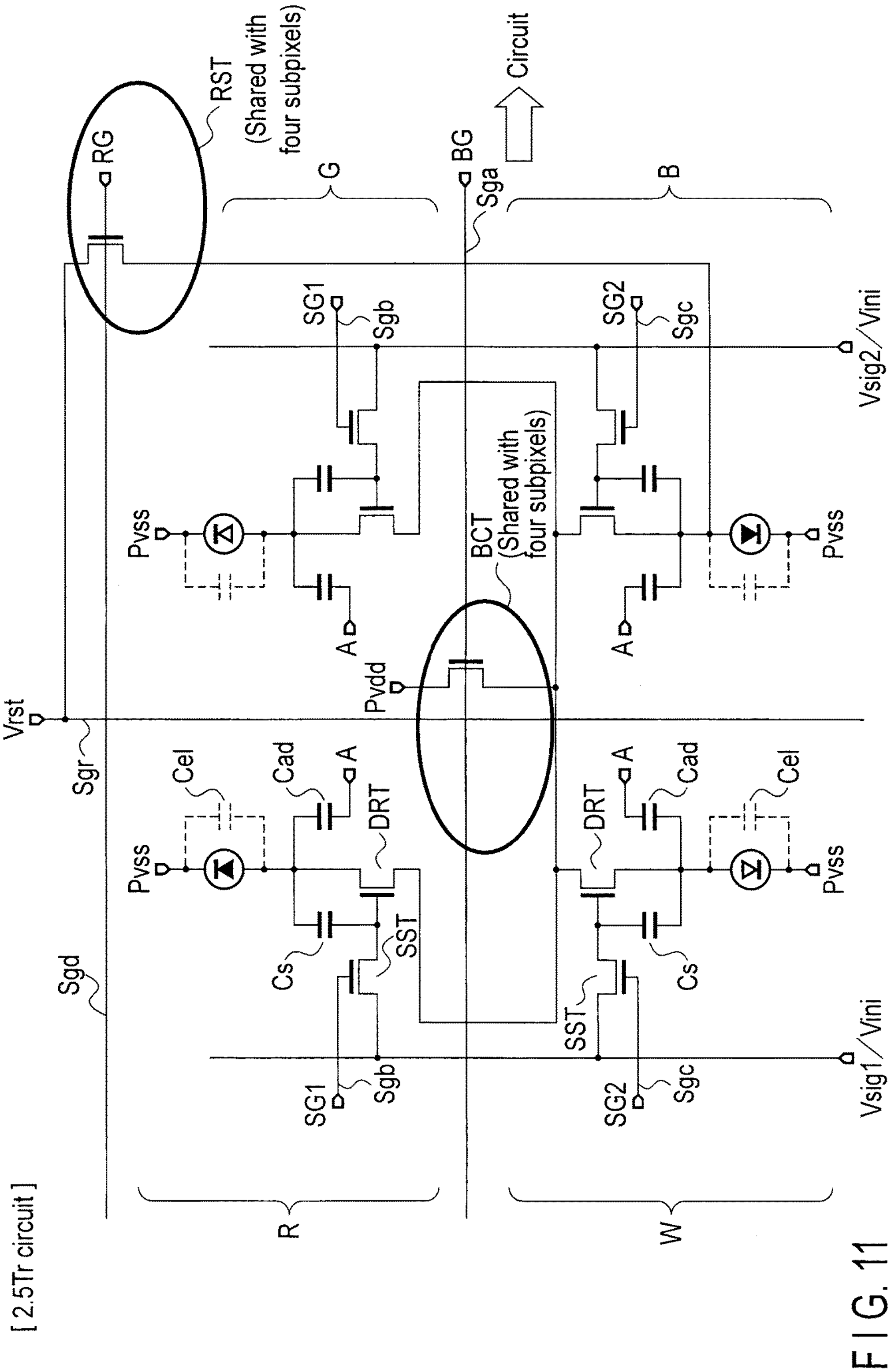
FIG. 11 is an exemplary view which shows an equivalent circuit of a variation of the display device of the second embodiment.

FIG. 11 is a view which shows an equivalent circuit of a variation of the display device of the second embodiment. In the example depicted in FIG. 11, only a single reset switch RST is provided with a single subpixel SPX. The reset power line Sgr is connected to the source electrode of the driving transistor DRT and the positive electrode of the OLED in a single subpixel SPX via the reset switch RST.

In the source initialization operation, the reset switch RST is caused to conduct and the driving transistors DRT of the four subpixels SPX are caused to conduct. The drain electrode is connected to all four driving transistors DRT. Thus, the source electrode and the drain electrode of the four driving transistors DRT have the same potential as the reset voltage Vrst, and the source initialization operation is finished.

In the circuitry of the pixel PX shown in FIG. 11, the four subpixels SPX are composed of a total of ten TFTs. That is, 2.5 (=10/4) TFTs are used per subpixel SPX. Thus, the circuitry depicted in FIG. 11 is referred to as 2.5 Tr circuitry.

Note that when the reset voltage Vrst is supplied via a single common reset switch RST, it should preferably be supplied to the blue subpixel SPX. Since blue is a color of which visibility is low as compared to the other colors, even when the reset voltage Vrst supplied would influence the display quality, such an influence can be suppressed.

Note that such a single common reset switch RST shared with subpixels SPX is not limited to the example shown in FIG. 11 where four subpixels SPX (R, G, B, W). That is, a single reset switch RST may be shared with three subpixels SPX (R, G, B) in a pixel PX. Or, a single reset switch RST may be shared with two pixels, that is, six subpixels SPX (a combination of RGB and RGB).

Figure 12:
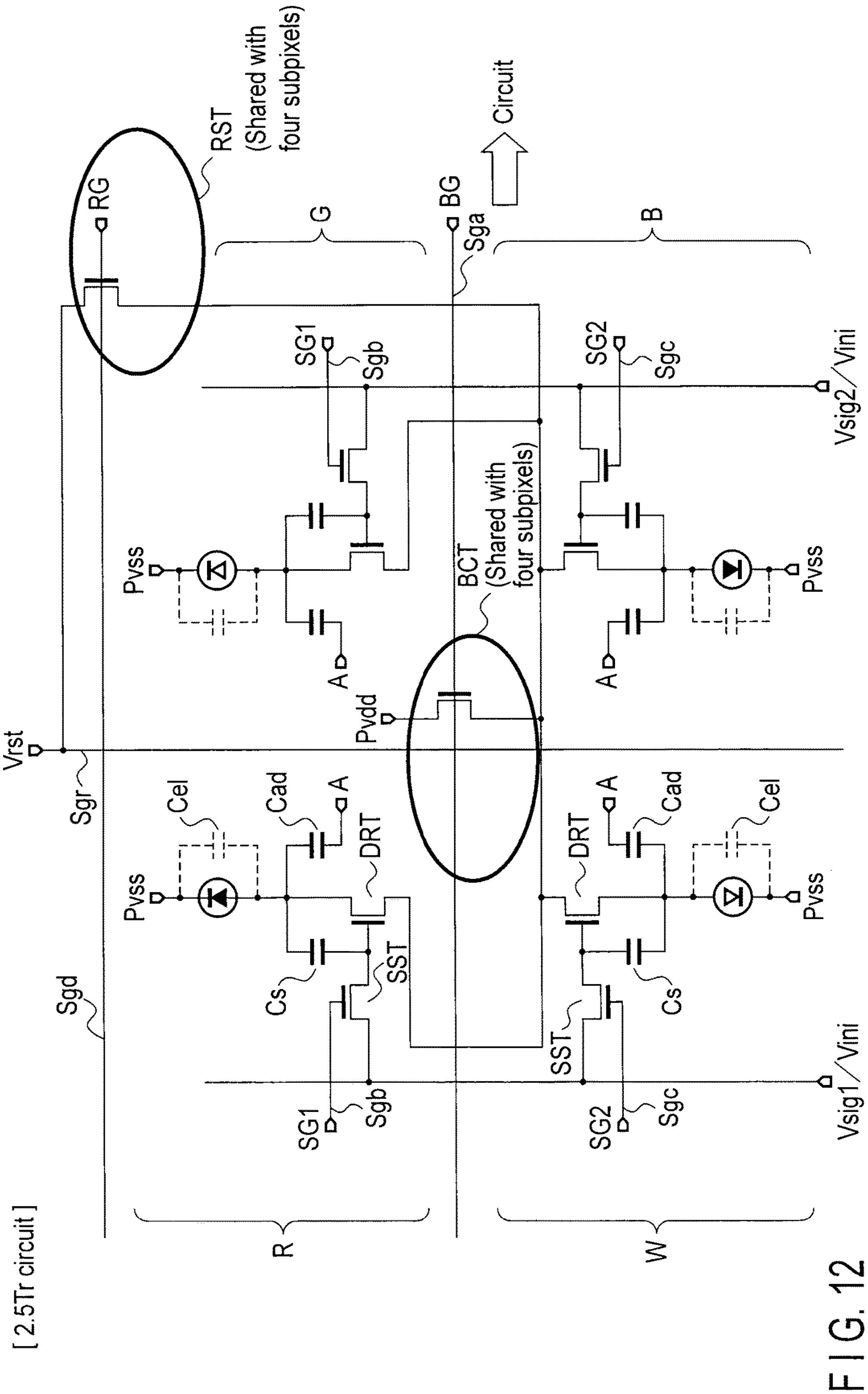
FIG. 12 is an exemplary view which shows an equivalent circuit of another variation of the display device of the second embodiment.

FIG. 12 is a view which shows an equivalent circuit of a variation of the display device of the second embodiment. In the example depicted in FIG. 12, a single reset switch RST is provided with a pixel PX as in FIG. 11. However, unlike FIG. 11, the reset power line Sgr is connected to the drain electrode of the driving transistor DRT of the subpixel SPX via the reset switch RST.

On the other hand, the drain electrode is shared with the driving transistors DRT of the four subpixels SPX. Thus, in the source initialization operation, when the reset switch RST is caused to conduct and the four subpixels SPX are caused to conduct, the source electrode and the drain electrode of the four driving transistors DRT have the same potential as the reset voltage Vrst, and the source initialization operation is finished.

Third Embodiment

Figure 13:
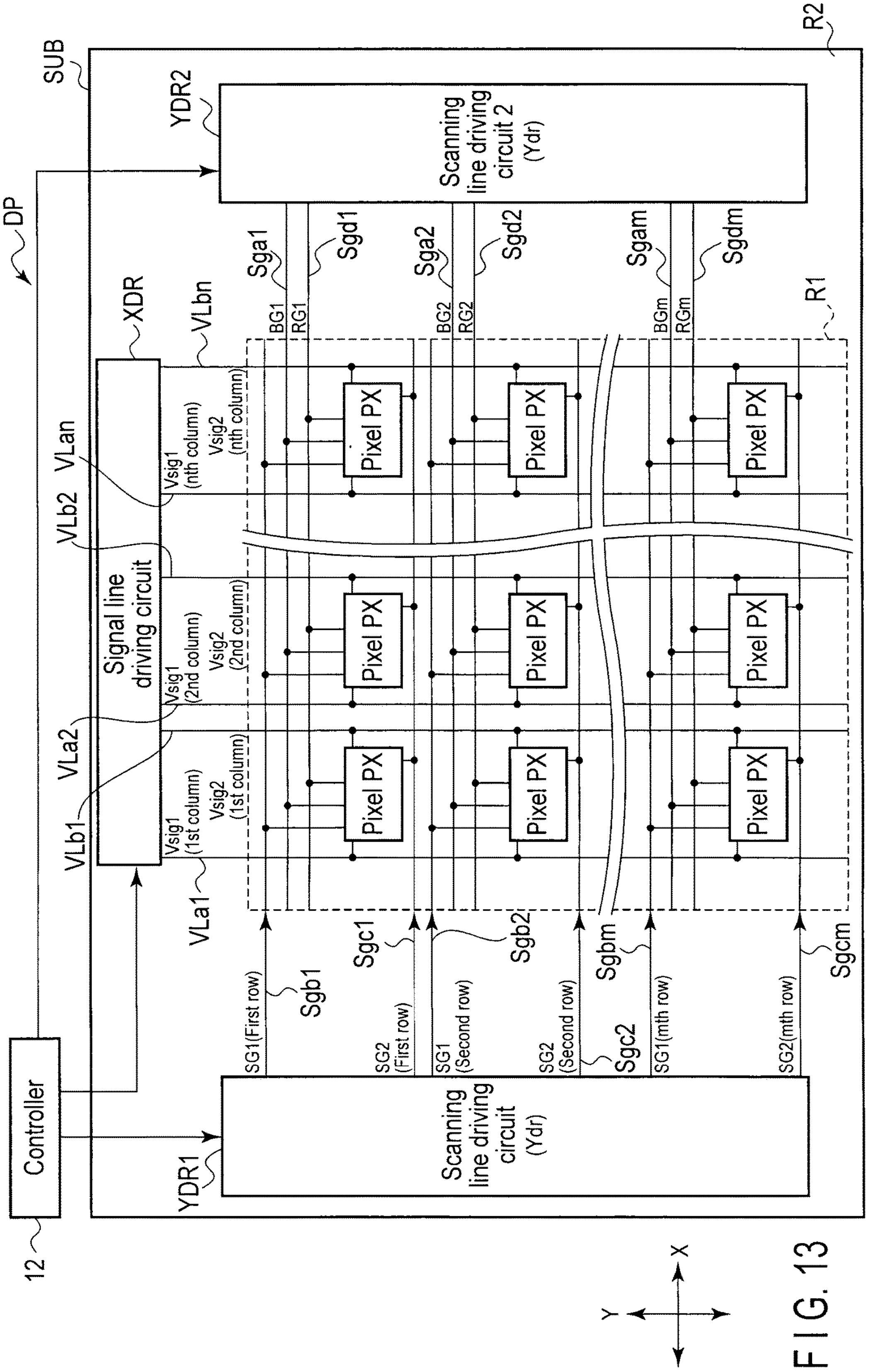
FIG. 13 is an exemplary plan view which schematically shows a display device of third embodiment.

FIG. 13 is a plan view which schematically shows a display device of third embodiment. The third embodiment differs from the second embodiment in respect of omitting a reset power line Sgr. The structural elements which are the same or have the same function as those of the second embodiment will be referred to by the same reference numbers and detailed descriptions of them will be omitted.

Figure 14:
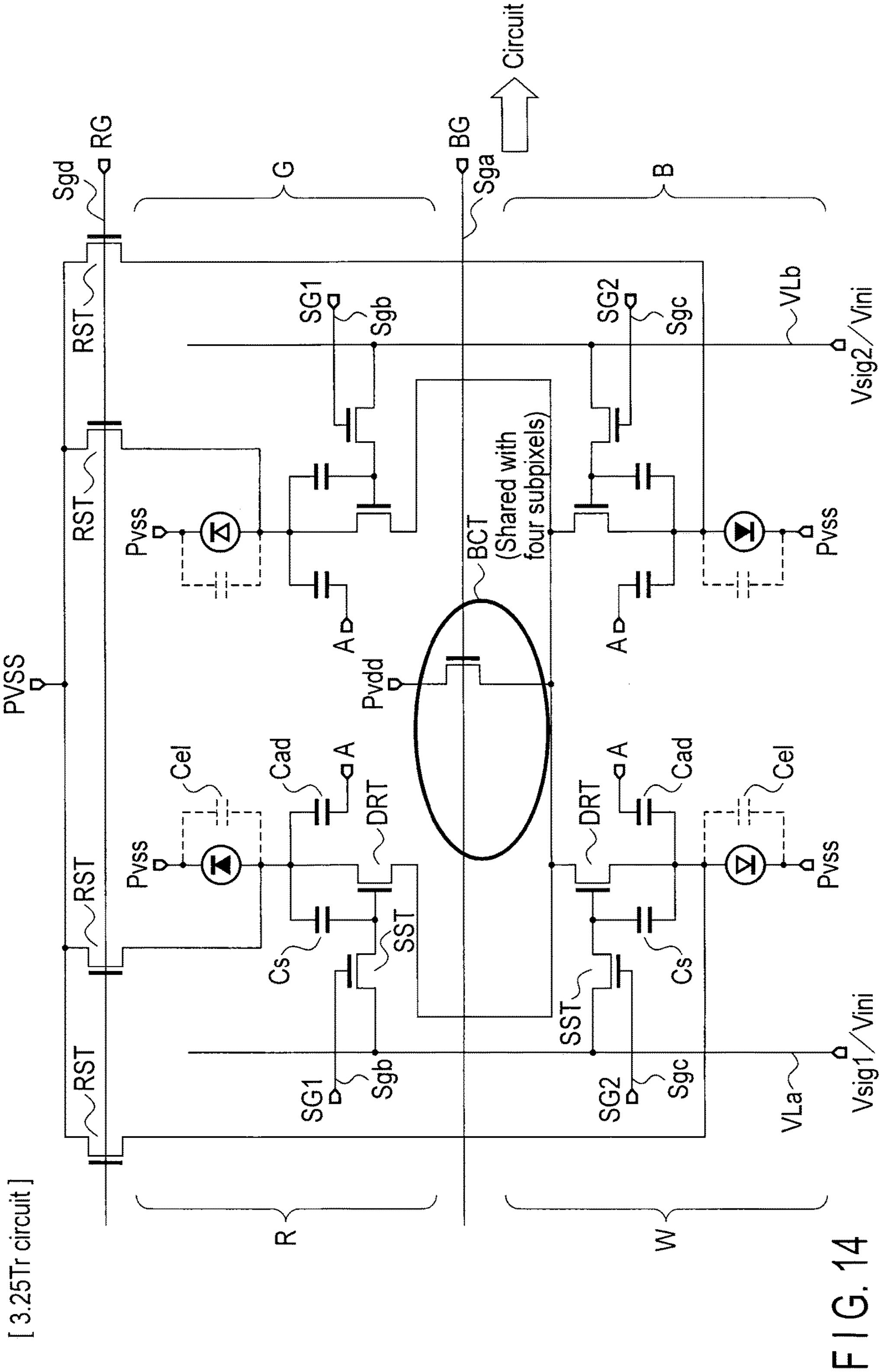
FIG. 14 is an exemplary view which schematically shows an equivalent circuit of a pixel of the display device of the third embodiment.

FIG. 14 shows an equivalent circuit of a pixel PX of the display device of FIG. 13. In the example depicted in FIG. 13, there is no reset power line Sgr provided, and low potential Pvss is used instead of reset voltage Vrst.

To achieve the above structure, a contact hole is provide within a pixel and the low potential Pvss is taken out of a conductive layer through the contact hole. The low potential Pvss is then input to a source electrode of each reset switch RST. That is, low potential Pvss can be taken inside the pixel circuit and this allows of an omission of a line from a scanning line driving circuit YDR2 and a line from a signal line driving circuit XDR those are adopted in the first and second embodiments.

Figure 15:
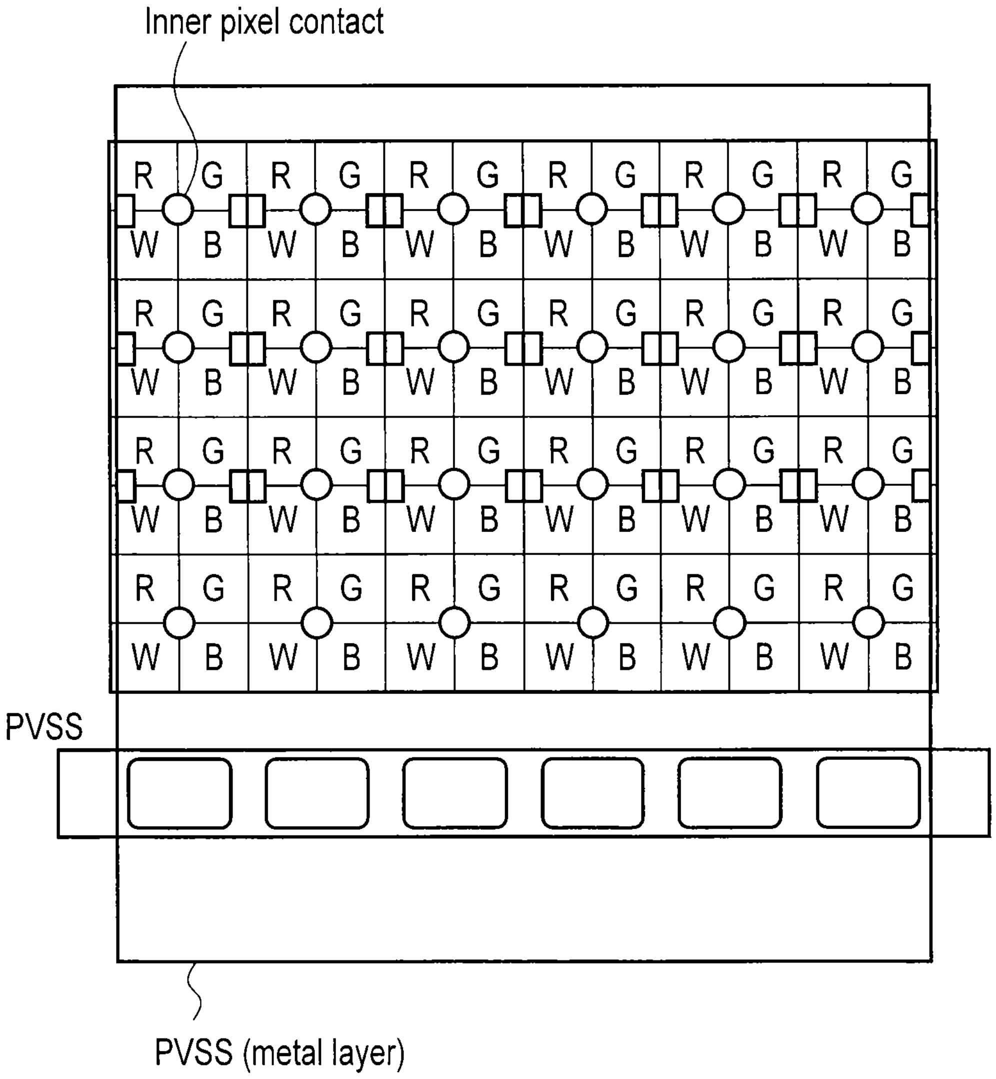
FIG. 15 is a plan view which shows an example of the display device of the third embodiment as a schematic entirety.

FIG. 15 is a plan view which shows a display device of example 1 of the third embodiment as a schematic entirety.

As shown in FIG. 15, a metal layer to supply low potential Pvss (for example, counterelectrode CE) is connected to a source electrode of each reset switch RST through a contact hole. In the example 1, a pixel PX is a so-called RGBW square pixel. The reset switch RST is disposed at a center part of four adjacent subpixels (two adjacent in column direction Y and two adjacent in row direction X). As can be understood from this point, one contact hole is provided with every four adjacent subpixels SPX.

Figure 16:
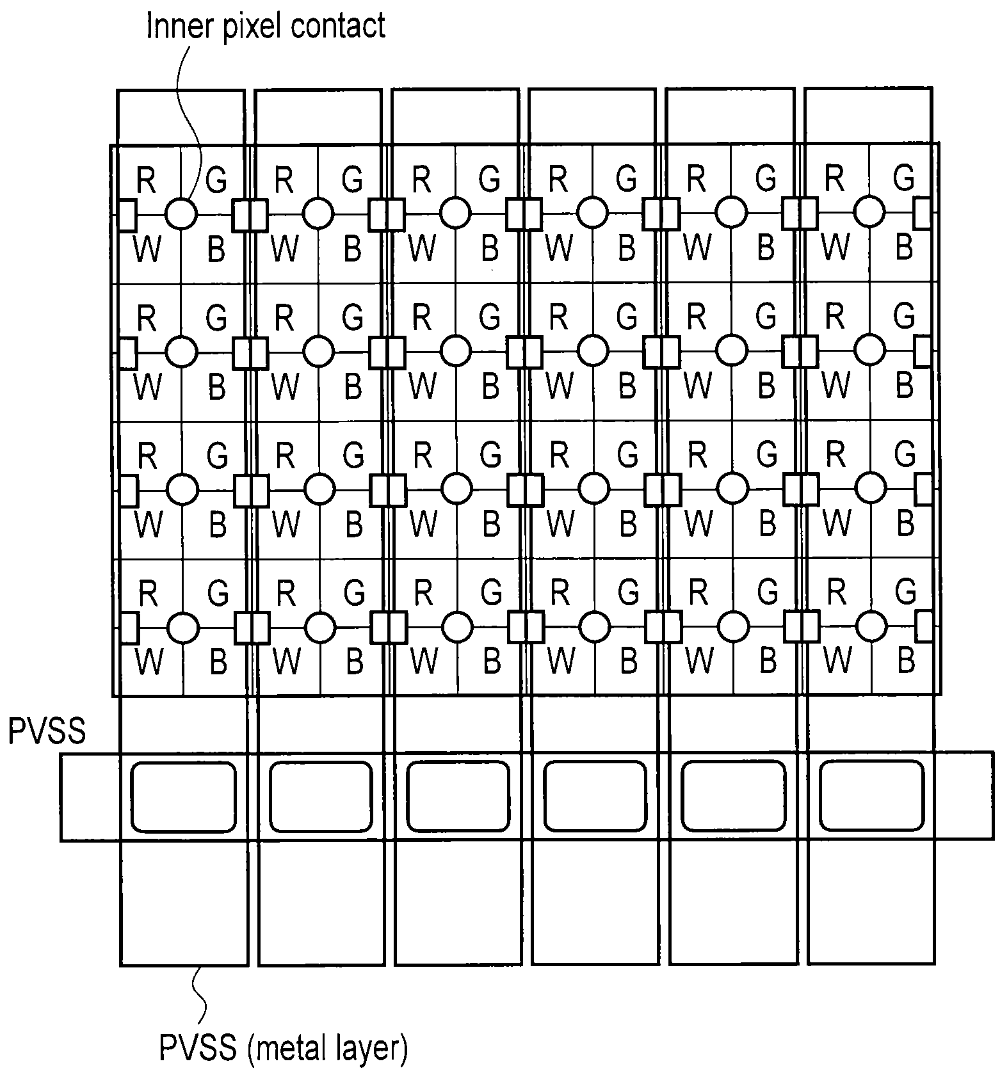
FIG. 16 is a plan view which shows another example of the display device of the third embodiment as a schematic entirety.

FIG. 16 is a plan view which shows a display device of example 2 of the third embodiment as a schematic entirety.

As shown in FIG. 16, a metal layer to supply low potential Pvss is formed substantially the same as that in FIG. 15. Here, the metal layer is divided into a plurality of bands extending in the column direction Y. The metal layer is opposed to the pixels PX in two adjacent columns. One metal layer is arranged apart from other metal layers in the row direction X. The metal layer is arranged out of a region opposed to the image signal line VL. Thus, a load of the image signal line VL and the like can be reduced.

Note that the operation of the equivalent circuit of FIG. 14 is the same as the operation described with reference to FIG. 10, and its detailed description is omitted.

Figure 17:
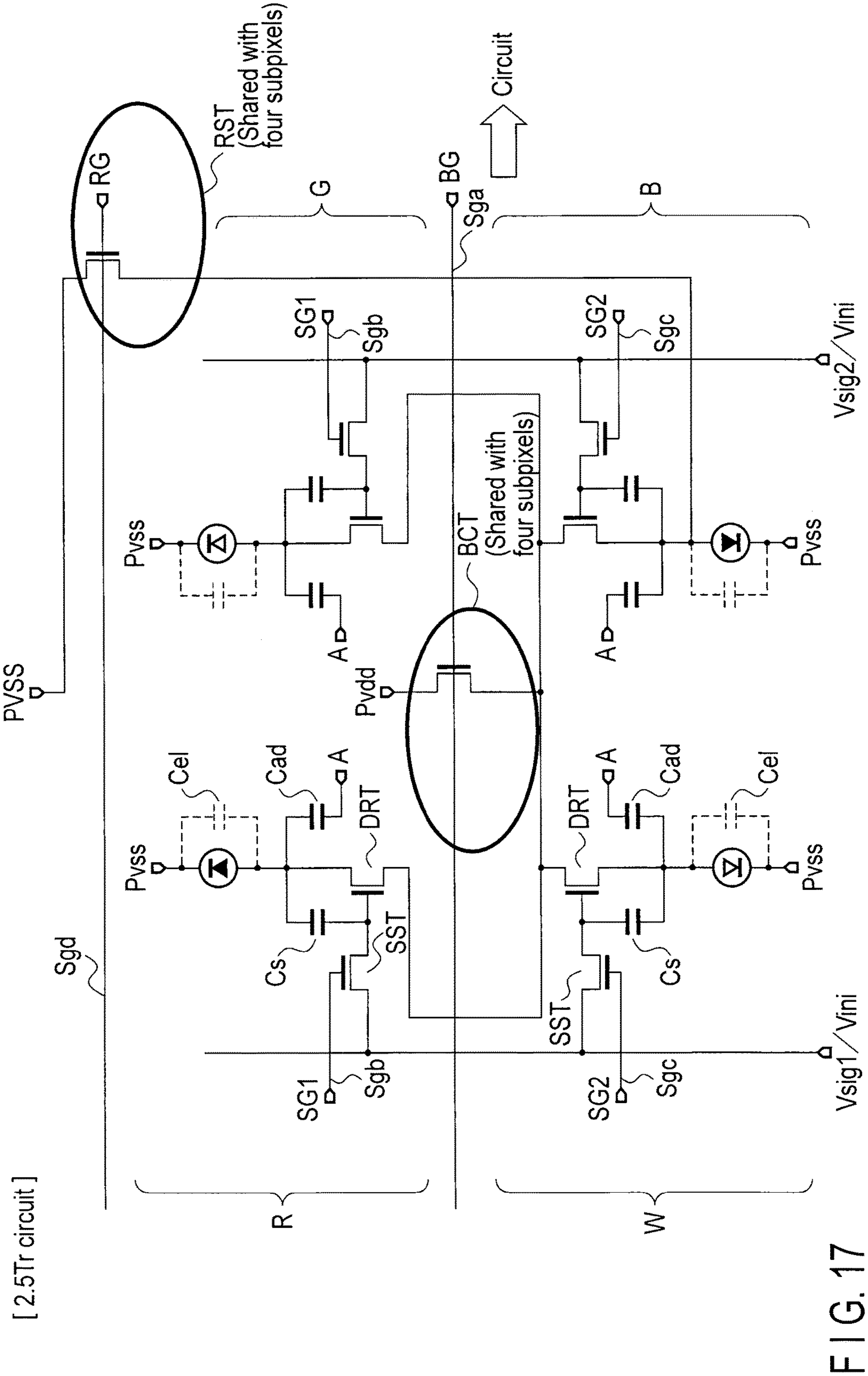
FIG. 17 is an exemplary view which shows an equivalent circuit of a variation of the display device of the third embodiment.

FIG. 17 is a view which shows an equivalent circuit of a variation of the display device of the third embodiment. In the example depicted in FIG. 17, one reset switch RST is provided with one pixel PX, and low potential Pvss is, through this reset switch RST, input to a source electrode of a driving transistor DRT of one subpixel SPX and a positive electrode of an OLED.

One reset switch RST is shared with four adjacent subpixels SPX (two adjacent in column direction Y and two adjacent in row direction X). As can be understood from this point, one contact hole is provided with every four adjacent subpixels SPX.

Note that the operation of the equivalent circuit of FIG. 17 is the same as the operation described with reference to FIG. 11, and its detailed description is omitted.

Figure 18:
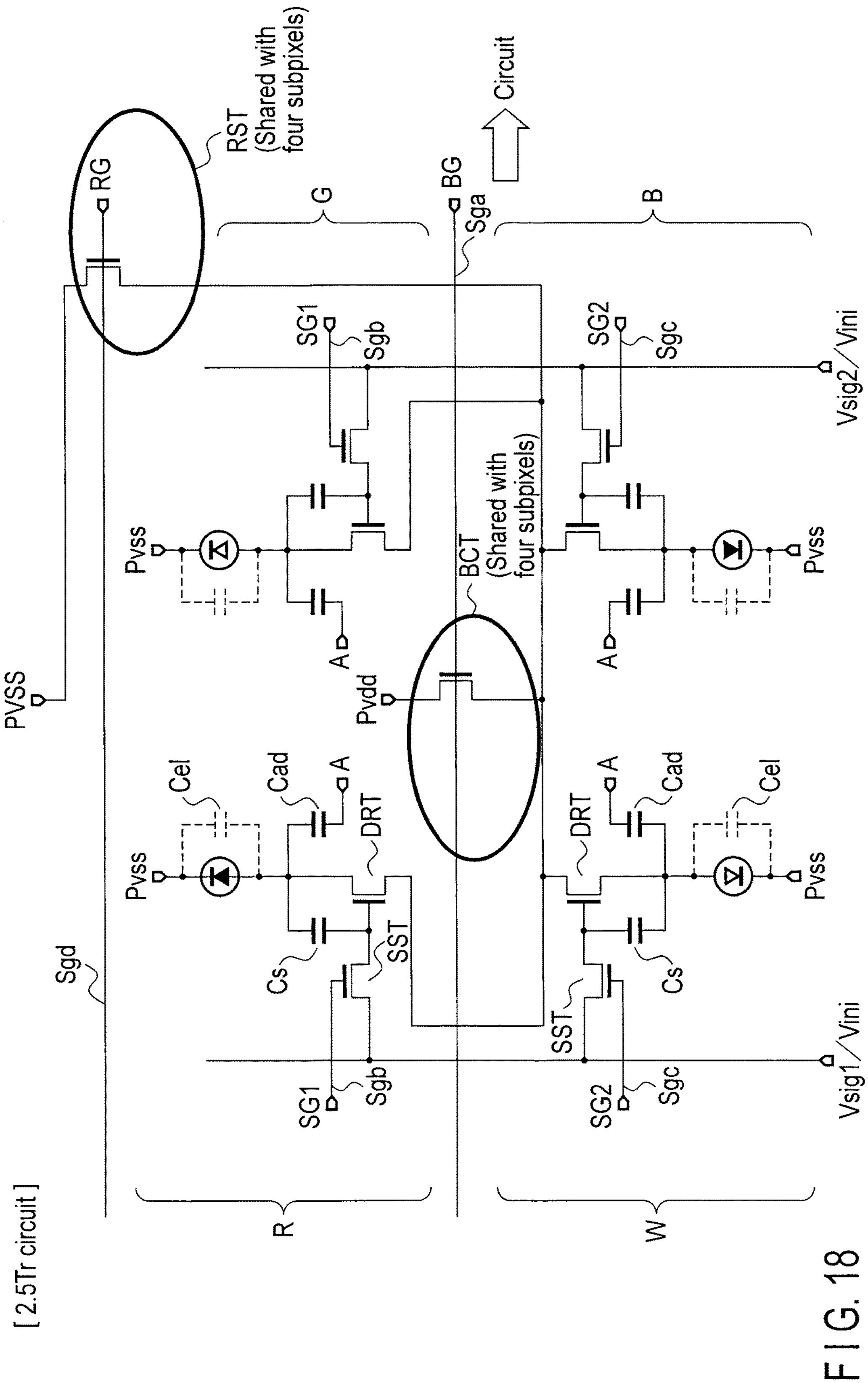
FIG. 18 is an exemplary view which shows an equivalent circuit of another variation of the display device of the third embodiment.

FIG. 18 is a view which shows an equivalent circuit of a variation of the display device of the third embodiment. In the example depicted in FIG. 18, one reset switch RST is provided with a pixel PX as in FIG. 17. However, unlike FIG. 17, low potential Pvss is, through the reset switch RST, input to a drain electrode of a driving transistor DRT of one subpixel SPX.

Note that the operation of the equivalent circuit of FIG. 18 is the same as the operation described with reference to FIG. 12, and its detailed description is omitted.

Now, a method for optimizing a layout is explained.

Figure 19:
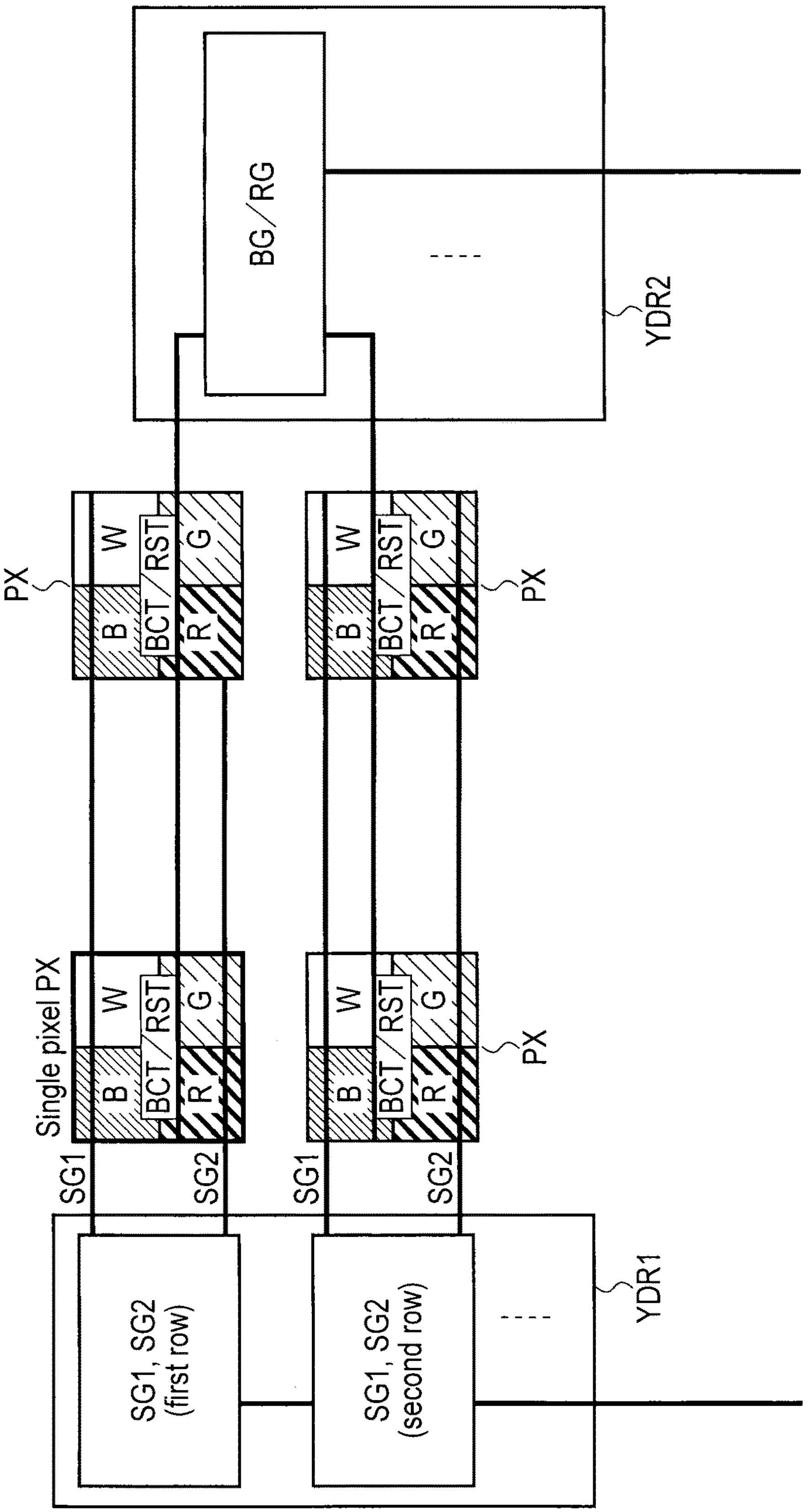
FIG. 19 is an exemplary view which shows a plurality of pixels PX arranged for optimizing layout of the display device of one embodiment.

FIG. 19 is a view which shows a plurality of pixels PX arranged for optimizing layout. As in FIG. 19, a pixel PX is a so-called RGBW square pixel. For example, in each pixel PX, an optional two of the four subpixels SPX of red, green, blue, and achromatic colors are arranged in the upper row and the other two subpixels SPX are arranged in the lower row.

Scanning line driving circuit YDR1 outputs control signals SG1 which drive the two subpixels SPX in the upper row of each pixel and control signals SG2 which drive the two subpixels SPX in the lower row of each pixel.

Furthermore, one output switch BCT and one reset switch RST are provided with one pixel PX, that is, are shared with four subpixels SPX. Scanning line driving circuit YDR2 outputs one control signal BG and one reset signal RG which drive output switches BCT and reset switches RST of pixels in two or more rows at the same time.

With such a structure, the number of scanning line driving circuits YDR2 can be reduced and the number of scanning lines can be reduced, too, and the layout of the display device can be optimized.

Figure 20:
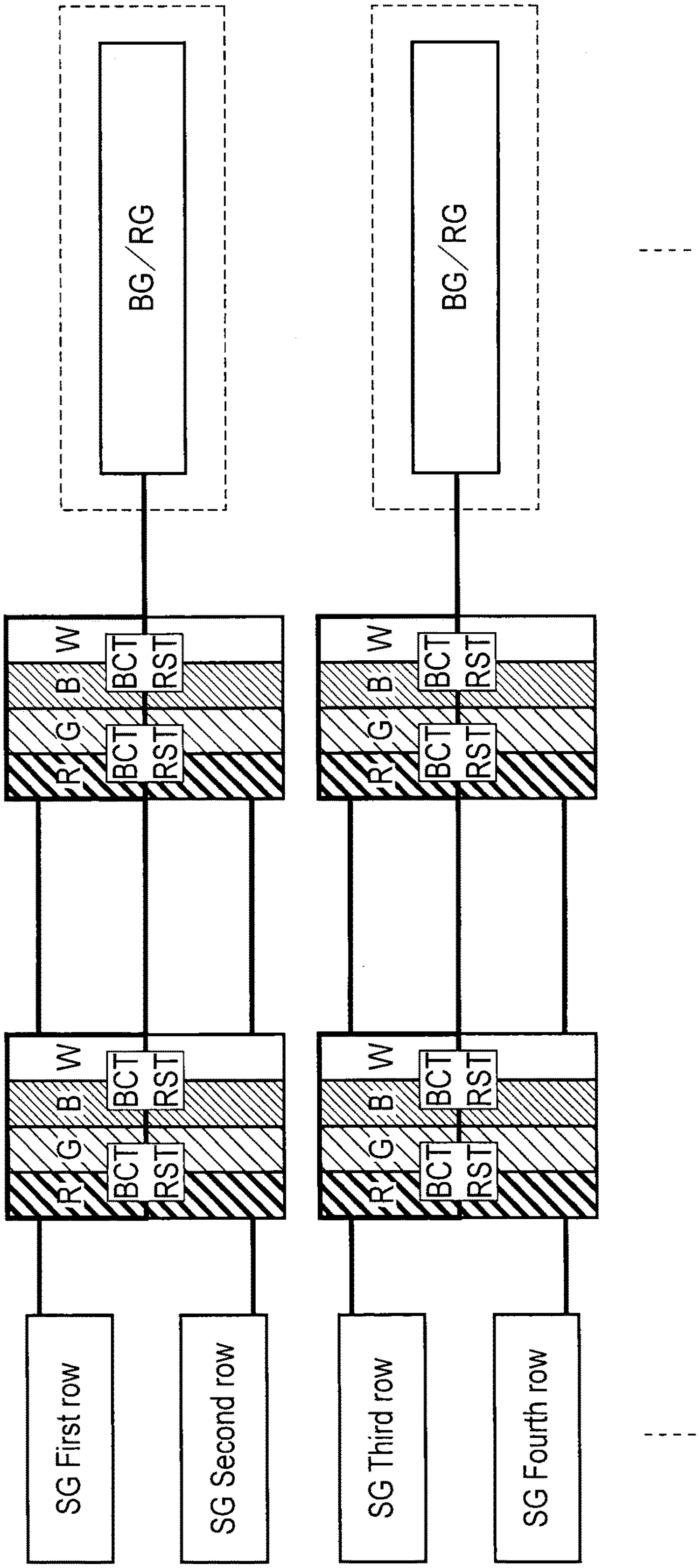
FIG. 20 is another exemplary view which shows a plurality of pixels PX arranged for optimizing layout of the display device of one embodiment.

FIG. 20 is a view which shows a plurality of pixels PX arranged for optimizing layout. As shown in FIG. 20, a pixel PX is a so-called vertical stripe pixel. A subpixel SPX configured to display a red image, a subpixel SPX configured to display a green image, a subpixel SPX configured to display a blue image, and a subpixel SPX configured to display an achromatic color are arranged in each pixel PX in this order in the row direction X. Scanning line driving circuit YDR1 outputs control signals SG which drive each pixel PX in a single row.

Furthermore, the output switch BCT and the reset switch RST are shared with four adjacent subpixels SPX (two adjacent in the column direction Y and two adjacent in the row direction X). Scanning line driving circuit YDR2 outputs one control signal BG and one reset signal RG which drive output switches BCT and reset switches RST of pixels in two rows at the same time.

With such a structure, the number of scanning line driving circuits YDR2 can be reduced and the number of scanning lines can be reduced, too, and the layout of the display device can be optimized.

Figure 21:
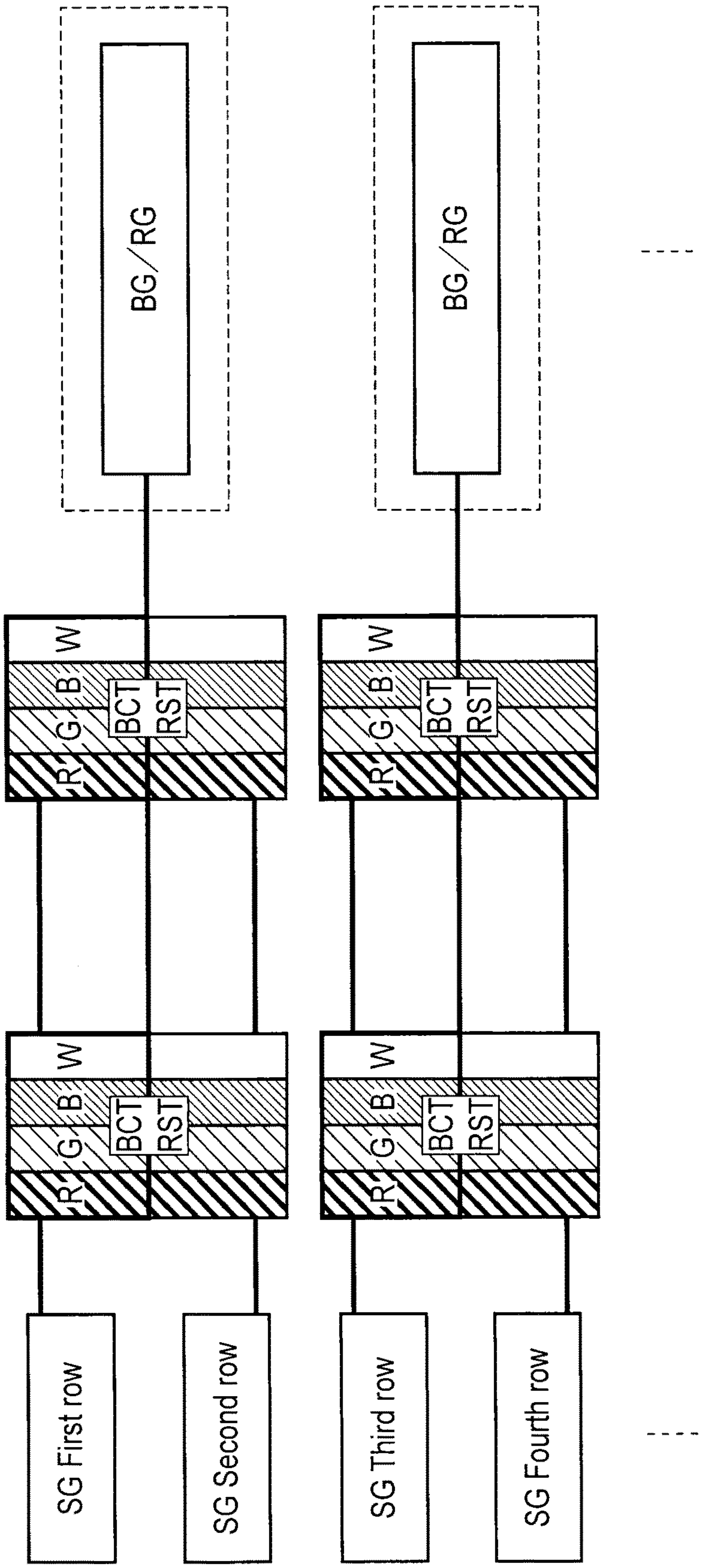
FIG. 21 is another exemplary view which shows a plurality of pixels PX arranged for optimizing layout of the display device of one embodiment.

FIG. 21 is a view which shows a plurality of pixels PX arranged for optimizing layout. As shown in FIG. 21, a pixel PX is a so-called vertical stripe pixel. Scanning line driving circuit YDR1 outputs control signals SG which drive each pixel PX in a single row.

Furthermore, the output switch BCT and the reset switch RST are shared with eight adjacent subpixels SPX (two adjacent in the column direction Y and four adjacent in the row direction X). Scanning line driving circuit YDR2 outputs one control signal BG and one reset signal RG which drive output switches BCT and reset switches RST of pixels in two rows at the same time.

With such a structure, the number of scanning line driving circuits YDR2 can be reduced, the number of scanning lines can be reduced, and the number of transistors used in the pixel circuits can be reduced. Thus, the layout of the display device can be optimized.

Figure 22:
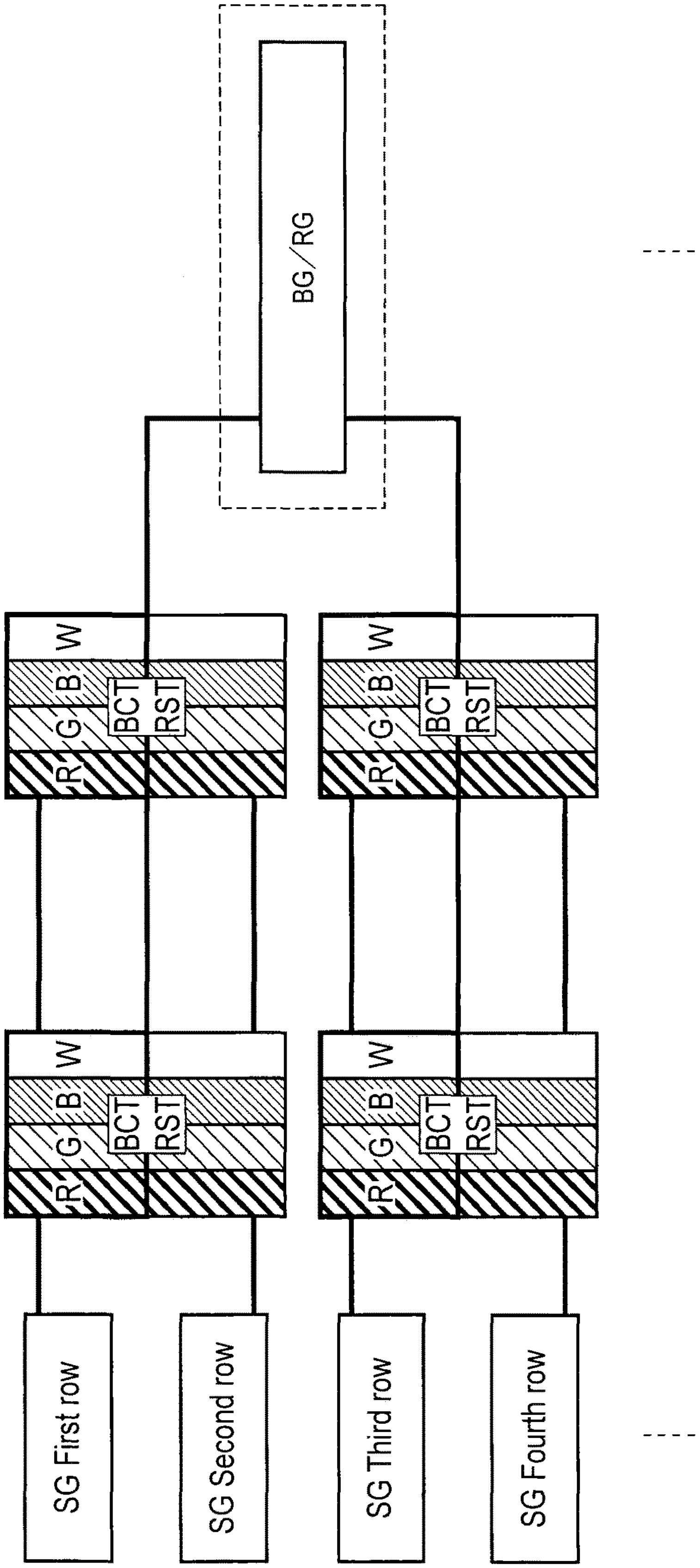
FIG. 22 is another exemplary view which shows a plurality of pixels PX arranged for optimizing layout of the display device of one embodiment.

FIG. 22 is a view which shows a plurality of pixels PX arranged for optimizing layout. As shown in FIG. 22, a pixel PX is a so-called vertical stripe pixel. Scanning line driving circuit YDR1 outputs control signals SG which drive each pixel PX in a single row.

Furthermore, the output switch BCT and the reset switch RST are shared with eight adjacent subpixels SPX (two adjacent in the column direction Y and four adjacent in the row direction X). Scanning line driving circuit YDR2 outputs one control signal BG and one reset signal RG which drive output switches BCT and reset switches RST of pixels in four rows at the same time.

With such a structure, the number of scanning line driving circuits YDR2 can be reduced, the number of scanning lines can be reduced, and the number of transistors used in the pixel circuits can be reduced. Thus, the layout of the display device can be optimized.

Now, a method for driving a plurality of rows with one control signal BG and one reset signal RG.

Figure 23:
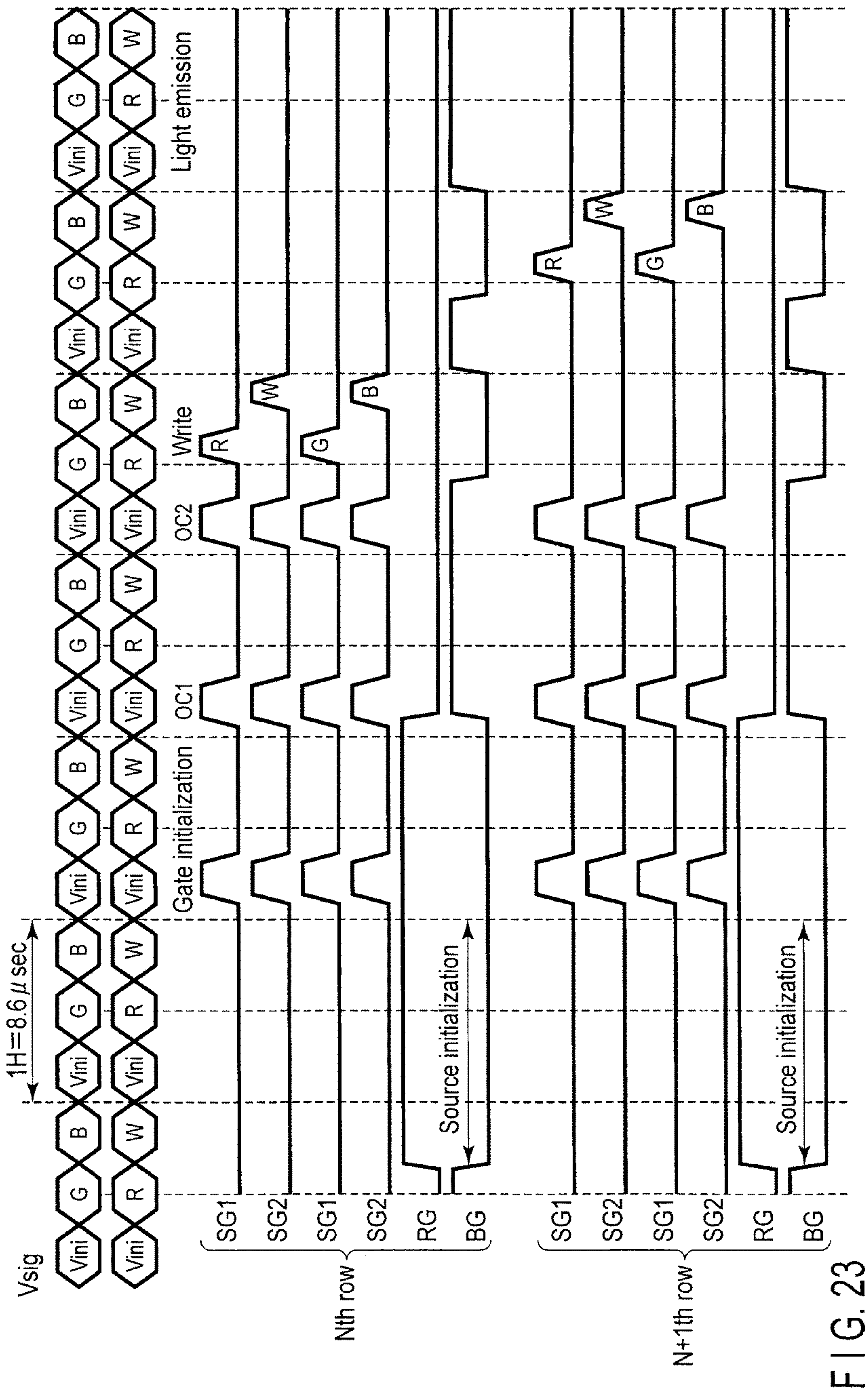
FIG. 23 is a timing chart which shows control signals of scanning line driving circuits in one example of the display device of the during the displaying operation.

FIG. 23 is a timing chart which shows control signals of scanning line driving circuits YDR1 and YDR2 in one example during the displaying operation. Note that a driving method of outputting control signals BG and reset signals RG row by row is already explained above with reference to, for example, FIG. 6, and thus, explanation considered redundant will be omitted.

In the driving method shown in FIG. 23, the source initialization operation, gate initialization operation, and offset cancel operation are performed in a plurality of rows ($N^{th}$ row, $N+1^{th}$ row) at the same time. On the other hand, in the write operation, gradation voltage signals Vsig are written to pixels PX of $N^{th}$ row in one horizontal period, and then, gradation voltage signals Vsig are written to pixels PX of $N+1^{th}$ row in a next horizontal period.

Figure 24:
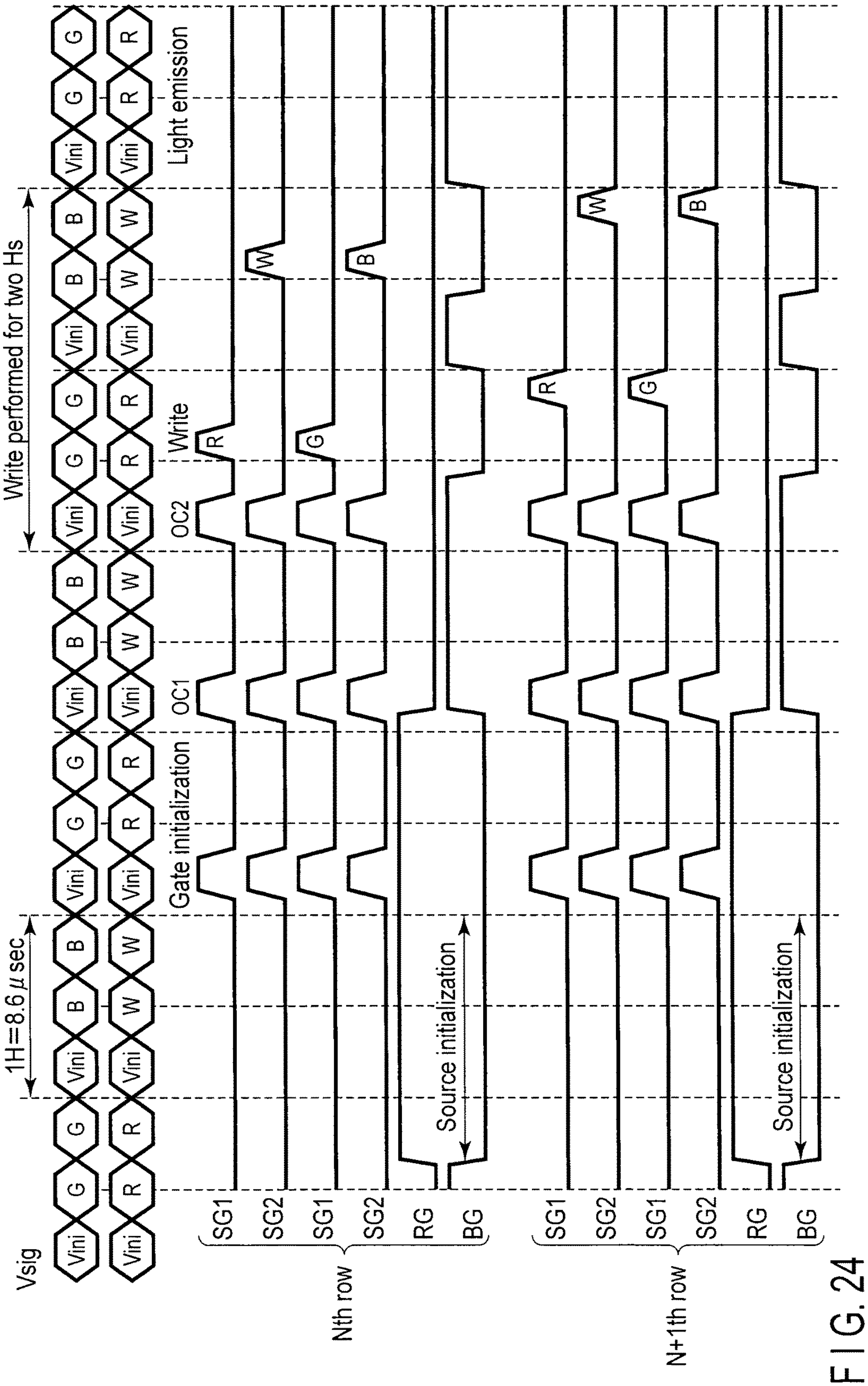
FIG. 24 is a timing chart which shows control signals of scanning line driving circuits in another example during the displaying operation.

FIG. 24 is a timing chart which shows control signals of scanning line driving circuits YDR1 and YDR2 in another example during the displaying operation.

In the driving method shown in FIG. 24, the source initialization operation, gate initialization operation, and offset cancel operation are performed in a plurality of rows ($N^{th}$ row, $N+1^{th}$ row) at the same time. On the other hand, in the write operation, gradation voltage signals Vsig are written to two subpixels SPX of each pixels PX of $N^{th}$ row and $N+1^{th}$ row in one horizontal period, and then, gradation voltage signals Vsig are written to the other two subpixels SPX of each pixels PX of $N^{th}$ row and $N+1^{th}$ row in the next horizontal period.

As explained above, when control signal BG and the reset signal RG are shared with a plurality of rows, the source initialization operation, gate initialization operation, and offset cancel (OC) operation are performed with respect to the plurality of rows at the same time while the write operation is performed row by row for suitable image display.

Note that the above-described embodiments are each applied to the structure with a pixel which is composed of four subpixels (RGBW arrangement pixel), but no limitation is intended thereby, and the embodiments can be applied to the structure with a pixel which is composed of three subpixels (RGB arrangement pixel), for example.

In the above-described embodiments, the transistors and switches of the circuitry of the display device are mainly N-type transistors; however, N-type transistors may be replaced with P-type transistors and P-type transistors may be replaced with N-type transistors. In that case, the pulse waveforms in the timing charts of the above-described embodiments draw reversed polarity.

Based on the display device and the driving method of the display device those have been described in the above, a person having ordinary skill in the art may achieve a display device and a driving method of such a display device with arbitral design changes; however, as long as they fall within the scope and spirit of the present invention, such a display device and a driving method are encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

Various inventions can be achieved by any suitable combination of a plurality of structural elements disclosed in the embodiments. For example, the some structural elements may be deleted from the whole structural elements indicated in the above-described embodiments. Furthermore, some structural elements of one embodiment may be combined with other structural elements of another embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:

a plurality of pixels arranged in a matrix on a substrate;

a plurality of first scanning lines arranged along a first direction;

a plurality of second scanning lines arranged along the first direction;

a plurality of image signal lines arranged along a second direction which intersects the first direction;

a plurality of reset power source lines arranged along the first direction or the second direction; and a first power source line, each of the plurality of pixels comprising:

a first subpixel;

a second subpixel which is adjacent to the first subpixel along the first direction or the second direction;

an output switch of which first terminal is connected to the first power source line and of which control terminal is connected to one of the plurality of first scanning lines; and a reset switch having a first terminal and a second terminal, wherein the first terminal is connected to one of the plurality of reset power source lines, each of the first subpixel and the second subpixel comprising:

a luminescent element;

a driving transistor of which first terminal is connected to a second terminal of the output switch and of which second terminal is connected to one electrode of the luminescent element;

a retaining capacitance connected between a control terminal and the second terminal of the driving transistor; and a pixel switch of which first terminal is connected to the control terminal of the driving transistor, of which second terminal is connected to one of the plurality of image signal lines, and of which control terminal is connected to one of the plurality of second scanning lines, wherein the reset switch is included in a pair of the first subpixel and the second subpixel, and the second terminal of the reset switch is connected to the second terminal of the driving transistor of the first subpixel, and is not connected to the second terminal of the driving transistor of the second subpixel.

2. The display device of claim 1, wherein each of the reset switch, the output switch, and the pixel switch comprises a transistor.

3. The display device of claim 1, further comprising:

a third subpixel; and a fourth subpixel which is adjacent to the third subpixel along the first direction or the second direction, each of the third subpixel and the fourth subpixel comprising:

a luminescent element;

a driving transistor of which first terminal is connected to the second terminal of the output switch and of which second terminal is connected to one electrode of the luminescent element;

a retaining capacitance connected between the control terminal and the second terminal of the driving transistor; and a pixel switch of which first terminal is connected to the control terminal of the driving transistor, of which second terminal is connected to one of the plurality of image signal lines, and of which control terminal is connected to one of the plurality of second scanning lines, wherein the first subpixel, the second subpixel, the third subpixel and the fourth subpixel are arranged in a matrix in each of the plurality of pixels.

4. The display device of claim 3, the second terminal of the reset switch is connected to the second terminal of the driving transistor of the first subpixel, and is not connected to the second terminals of the driving transistors of the second, third and fourth subpixels.

5. The display device of claim 3, wherein each of the reset switch, the output switch, and the pixel switch comprises a transistor.

6. A display device comprising:

a plurality of pixels arranged in a matrix on a substrate;

a plurality of first scanning lines arranged along a first direction;

a plurality of second scanning lines arranged along the first direction;

a plurality of image signal lines arranged along a second direction which intersects the first direction;

a plurality of reset power source lines arranged along the first direction or the second direction; and a first power source line, each of the plurality of pixels comprising:

a first subpixel;

a second subpixel which is adjacent to the first subpixel along the first direction or the second direction;

an output switch of which first terminal is connected to the first power source line and of which control terminal is connected to one of the plurality of first scanning lines; and a reset switch of which first terminal is connected to one of the plurality of reset power source lines, each of the first subpixel and the second subpixel comprising:

a luminescent element;

a driving transistor of which first terminal is connected to a second terminal of the output switch and of which second terminal is connected to one electrode of the luminescent element;

a retaining capacitance connected between a control terminal and the second terminal of the driving transistor; and a pixel switch of which first terminal is connected to the control terminal of the driving transistor, of which second terminal is connected to one of the plurality of image signal lines, and of which control terminal is connected to one of the plurality of second scanning lines, wherein the reset switch is included in a pair of the first subpixel and the second subpixel, and a second terminal of the reset switch is connected to the first terminal of the driving transistor of the first subpixel and the first terminal of the driving transistor of the second subpixel.

7. The display device of claim 6, wherein each of the reset switch, the output switch, and the pixel switch comprises a transistor.

8. The display device of claim 6, further comprising:

a third subpixel; and a fourth subpixel which is adjacent to the third subpixel along the first direction or the second direction, each of the third subpixel and the fourth subpixel comprising:

a luminescent element;

a driving transistor of which first terminal is connected to the second terminal of the output switch and of which second terminal is connected to one electrode of the luminescent element;

a retaining capacitance connected between the control terminal and the second terminal of the driving transistor; and a pixel switch of which first terminal is connected to the control terminal of the driving transistor, of which second terminal is connected to one of the plurality of image signal lines, and of which control terminal is connected to one of the plurality of second scanning lines, wherein the first subpixel, the second subpixel, the third subpixel and the fourth subpixel are arranged in a matrix in each of the plurality of pixels.

9. The display device of claim 8, wherein the second terminal of the reset switch is connected to the first terminal of the driving transistor of the first subpixel, the first terminal of the driving transistor of the second subpixel, the first terminal of the driving transistor of the third subpixel, and the first terminal of the driving transistor of the fourth subpixel.

10. The display device of claim 8, wherein each of the reset switch, the output switch, and the pixel switch comprises a transistor.

* * * * *